US009816641B2

(12) United States Patent
Bock-Aronson et al.

(10) Patent No.: US 9,816,641 B2
(45) Date of Patent: Nov. 14, 2017

(54) TRANSVERSE HANDLE ASSEMBLY FOR A VALVE

(71) Applicant: Kohler Co., Kohler, WI (US)

(72) Inventors: Max Bock-Aronson, Minneapolis, MN (US); Murali Natarajan, Thirumangalam (IN); Benjamin W. Marotz, Kohler, WI (US); Michael J. Strege, Plymouth, WI (US); Jeffrey Schumacher, Port Washington, WI (US); Joel Smith, Cedarburg, WI (US); Sharathkumar Badiger, Sheboygan, WI (US)

(73) Assignee: KOHLER CO., Kohler, WI (US)

( * ) Notice: Subject to any disclaimer, the term of this patent is extended or adjusted under 35 U.S.C. 154(b) by 0 days.

(21) Appl. No.: 14/965,526

(22) Filed: Dec. 10, 2015

(65) Prior Publication Data

US 2016/0097466 A1   Apr. 7, 2016

Related U.S. Application Data

(63) Continuation of application No. 14/476,232, filed on Sep. 3, 2014, now Pat. No. 9,234,606, which is a (Continued)

(51) Int. Cl.
F16K 31/60 (2006.01)
F16K 31/53 (2006.01)
E03C 1/04 (2006.01)

(52) U.S. Cl.
CPC .......... *F16K 31/53* (2013.01); *E03C 1/0412* (2013.01); *F16K 31/602* (2013.01); *Y10T 137/6024* (2015.04)

(58) Field of Classification Search
CPC ........... Y10T 137/9464; Y10T 137/698; Y10T 137/6024; F16K 31/602; F16K 31/60;
(Continued)

(56) References Cited

U.S. PATENT DOCUMENTS 667,219 A    2/1901  Griffith
1,233,084 A  7/1917  McMurray
(Continued)

FOREIGN PATENT DOCUMENTS

CN    101137861 A    3/2008
CN    201944370 U    8/2011
DE    29504966       5/1995

*Primary Examiner* — Matthew W Jellett
(74) *Attorney, Agent, or Firm* — Foley & Lardner LLP

(57) ABSTRACT

A handle assembly configured to control water flow through a faucet valve. The handle assembly includes an output shaft rotatable about a first axis and configured to be operatively coupled to the valve; an input shaft rotatable about a second axis that is configured substantially transverse to the first axis, the input shaft configured to engage the output shaft to rotate the output shaft upon rotation of the input shaft; a handle coupled to the input shaft and configured to rotate the input shaft upon rotation of the handle about the second axis; and a saddle interconnecting the input shaft and the output shaft. The saddle includes a body having a channel that supports one of the input shaft and the output shaft, and a post extending away from the body and engaging an opening in the other of the input shaft and the output shaft.

21 Claims, 32 Drawing Sheets

Related U.S. Application Data continuation-in-part of application No. 13/794,544, filed on Mar. 11, 2013, now Pat. No. 9,151,405.

(58) Field of Classification Search
CPC ........ F16K 31/53; F16K 31/535; F16K 31/44; F16K 31/504; F16K 31/508; E03C 1/0412; B25B 17/00; B25B 13/467; B25B 13/481; G05G 1/10; B61H 13/04; F16H 55/0846; F16H 1/203
USPC .......... 81/57.29; 74/416, 504, 507; 251/229, 251/248, 205.5
See application file for complete search history.

(56) References Cited

U.S. PATENT DOCUMENTS

| | | | |
|---|---|---|---|
| 1,421,687 A * | 7/1922 | Haynes | F16K 3/0254 251/176 |
| 1,506,433 A | 8/1924 | Knauf | |
| 1,645,570 A * | 10/1927 | Anderson | B25B 17/00 81/57.29 |
| 2,004,860 A | 6/1935 | Ferrari et al. | |
| 2,006,742 A | 7/1935 | Miller | |
| 2,204,257 A | 6/1940 | Blair | |
| 2,964,961 A | 12/1960 | Gulich | |
| 3,467,132 A | 9/1969 | Parisi | |
| 3,698,438 A * | 10/1972 | Rozmus | F16K 11/087 137/625.46 |
| 4,105,043 A * | 8/1978 | Nicolayczik | F16K 3/08 137/454.2 |
| 4,350,322 A * | 9/1982 | Mueller | F16K 31/502 137/556 |
| 4,437,355 A | 3/1984 | Bordat | |
| 4,493,343 A * | 1/1985 | Arnold | F16K 11/078 137/625.17 |
| 4,719,813 A | 1/1988 | Chalik | |
| 4,776,363 A | 10/1988 | Avelli | |
| 6,354,643 B1 | 3/2002 | Podejko | |
| 6,419,214 B2 | 7/2002 | Palinkas | |
| 6,446,660 B1 | 9/2002 | Goni Usabiaga | |
| 6,745,995 B2 | 6/2004 | Hu et al. | |
| 7,178,786 B2 | 2/2007 | Turnau, III et al. | |
| 7,584,898 B2 | 9/2009 | Schmitt et al. | |
| 7,624,757 B2 | 12/2009 | Schmitt | |
| 2006/0174946 A1 | 8/2006 | Kajuch | |
| 2006/0180222 A1 | 8/2006 | Kang | |
| 2007/0145319 A1 | 6/2007 | Hoernig | |
| 2009/0108223 A1 | 4/2009 | Deutsch et al. | |
| 2010/0181509 A1 | 7/2010 | Held et al. | |
| 2011/0000564 A1 | 1/2011 | Corbin et al. | |
| 2012/0042956 A1 | 2/2012 | Ben-Dor | |

\* cited by examiner

TRANSVERSE HANDLE ASSEMBLY FOR A VALVE

CROSS-REFERENCE TO RELATED PATENT APPLICATIONS

This application is a continuation of U.S. application Ser. No. 14/476,232, filed Sep. 3, 2014, which claims the benefit of U.S. Provisional Application No. 61/873,830, filed Sep. 4, 2013, and which is a continuation-in-part of U.S. application Ser. No. 13/794,544, filed Mar. 11, 2013, all of which are incorporated by reference herein in their entireties.

BACKGROUND

The present application relates generally to the field of valve actuation. The present application relates more specifically to the field of valve actuators having a geartrain.

Traditionally, lavatory faucet handles feature a direct drive between the handle and the valve. That is, the handle rotates about the axis of the valve stem. Usually this results in rotation of the handle occurring in a plane that is substantially parallel to that of mounting surface. However, one may desire the handle to rotate in a plane that is not parallel (e.g., perpendicular) to the mounting surface. One solution is to mount the valve at an angle relative to the mounting surface, but this requires a larger body and increases the costs of the handle assembly.

Other solutions, for example, US 2007/0145319 and DE 29504966.9, have used gearsets change the axis of rotation between the handle and the valve. However, these designs have shortcomings with regards to size, durability, and user experience (i.e., "feel"). Thus, there is a need for an improved handle assembly for controlling a fluid control valve, the handle assembly including a geartrain for changing the axis of rotation between the handle and the valve.

SUMMARY

One embodiment relates to a handle assembly for a valve system. The handle assembly includes a first gear coupled to an input shaft, a handle coupled to the input shaft, a second gear coupled to an output shaft and positioned to engage the first gear, and a spring interconnected to one of the first gear and the second gear and applying a force on the one of the first gear and the second gear towards the other of the first gear and the second gear. The spring may be coupled to the output shaft. The spring may be a wave spring. Each of the first gear and the second gear may be a bevel gear. The input shaft may at least partially defines a first axis extending axially through the first gear, and the output shaft may at least partially defines a second axis extending axially through the second gear, and the first axis may be substantially transverse the second axis. The handle assembly may include a body defining a cavity receiving the first gear and the second gear and at least partially receiving the input shaft and the output shaft. A key may be supported by the body, and the input shaft may include a longitudinal surface, a portion of which defines a substantially flat region that selectively engages the key, thereby limiting rotation of the input shaft. At least one of the first gear and the second gear may include a collar having an annular groove therein, and an o-ring may be seated in the groove and contacting an inner surface of the body to provide a resistive force to rotation of the at least one of the first gear and the second gear. The input shaft may include a first end, a second end opposite the first end, and a point therebetween, and a structure overmolded on the input shaft between the point and the first end, the structure having an interference fit with a bore in the handle. The handle assembly may include a saddle interconnecting the input shaft and the output shaft. The handle assembly may include a bushing coupled to the output shaft and configured to provide radial forces on the output shaft to encourage engagement of the teeth of the gears, thereby reducing gear lash.

Another embodiment relates to a handle assembly for a valve system. The handle assembly includes a body defining a cavity, an input shaft at least partially located in the cavity, a handle coupled to the input shaft, and a first gear located in the cavity and coupled to the input shaft. The handle assembly further includes an output shaft at least partially located in the cavity, a second gear coupled to the output shaft and located in the cavity engaging the first gear, and at least one key supported by the body. At least one of the input shaft and the output shaft include a first portion having cross-section that is other than circular, and the first portion selectively engages the at least one key, thereby limiting rotation of the at least one of the input shaft and the output shaft. The at least one key may be an integral formation of the body. The cross-section may include a substantially flat first side and a second side extending in an arc from the first side, wherein the first side engages the at least one key to limit rotation. The cross-section may include a third side opposite the first side, the second side extending between the first side and the third side; and a fourth side opposite the second side and extending in an arc between the first side and the third side; wherein the second side and the fourth side are segments of a common circle and are supported by an inner diameter of a bearing coupled to the body. The at least one key may include a wedge shape having a first slope and a second slope having a first angle therebetween, the first angle being greater than the operational rotational angle of a valve operably coupled to the output shaft. The handle assembly may include a spring coupled to one of the input shaft and the output shaft and applying a force to the one of the input shaft and the output shaft to push one of the first gear and the second gear into engagement with the other of the first gear and the second gear. The input shaft may include a structure overmolded onto the input shaft, the structure having an interference fit with a bore in the handle. The handle assembly may include a saddle interconnecting the input shaft and the output shaft. The handle assembly may include a bushing coupled to the output shaft and configured to provide radial forces on the output shaft to encourage engagement of the teeth of the gears, thereby reducing gear lash.

Another embodiment relates to a handle assembly for a valve system. The handle assembly includes an input shaft having a first end and a second end opposite the first end, a structure overmolded on the input shaft extending at least partially between the first end and the second end, a handle coupled to the first end of the input shaft and having an inner surface defining a bore, the inner surface having an interference fit with the structure, and a first gear coupled to the input shaft. The handle assembly further includes an output shaft and a second gear coupled to the output shaft and engaging the first gear. The structure may include a plurality of tapered ribs that decrease in height toward the first end, and wherein the plurality of ribs may be crushed by the handle when the handle is coupled to the input shaft. Each of the input shaft, the structure, and the inner surface of the handle may include a portion having a cross-section including a first side, a second side opposite and substantially parallel to the first side, a third side extending in an arc between the first side and the second side, and a fourth side opposite the third side and extending in an arc between the first side and the second side, wherein the third side and the fourth side are segments of a common circle. The handle assembly may include a spring coupled to one of the input shaft and the output shaft and applying a force to the one of the input shaft and the output shaft to push one of the first gear and the second gear into engagement with the other of the first gear and the second gear, a body defining a cavity receiving the first gear and the second gear and at least partially receiving the input shaft and the output shaft, and a key supported by the body, wherein at least one of the input shaft and the output shaft comprise a first portion having cross-section that is other than circular, the first portion selectively engaging the at least one key, thereby limiting rotation of the at least one of the input shaft and the output shaft relative to the body. The handle assembly may include a saddle interconnecting the input shaft and the output shaft. The handle assembly may include a bushing coupled to the output shaft and configured to provide radial forces on the output shaft to encourage engagement of the teeth of the gears, thereby reducing gear lash.

Another embodiment relates to a handle assembly for a valve system. The handle assembly includes a first gear coupled to an input shaft, a handle coupled to the input shaft, a second gear coupled to an output shaft and positioned to engage the first gear, and a saddle interconnecting the input shaft and the output shaft.

Another embodiment relates to a handle assembly for a valve system. The handle assembly includes a first gear coupled to an input shaft, a handle coupled to the input shaft, a second gear coupled to an output shaft and positioned to engage the first gear, and a bushing coupled to the output shaft and configured to provide radial forces to the output shaft to encourage engagement of the teeth of the first gear and the second gear.

Another embodiment relates to a handle assembly for a valve system. The handle assembly includes a first gear coupled to an input shaft, a handle coupled to the input shaft, a second gear coupled to an output shaft and positioned to engage the first gear, a spring interconnected to one of the first gear and the second gear and applying a force on the one of the first gear and the second gear towards the other of the first gear and the second gear, a saddle interconnecting the input shaft and the output shaft, and a bushing coupled to the output shaft and configured to provide radial forces to the output shaft to encourage engagement of the teeth of the first gear and the second gear.

The foregoing is a summary and thus, by necessity, contains simplifications, generalizations, and omissions of detail. Consequently, those skilled in the art will appreciate that the summary is illustrative only and is not intended to be in any way limiting. Other aspects, inventive features, and advantages of the devices and/or processes described herein will become apparent in the detailed description set forth herein and taken in conjunction with the accompanying drawings.

DETAILED DESCRIPTION

Figure 1:
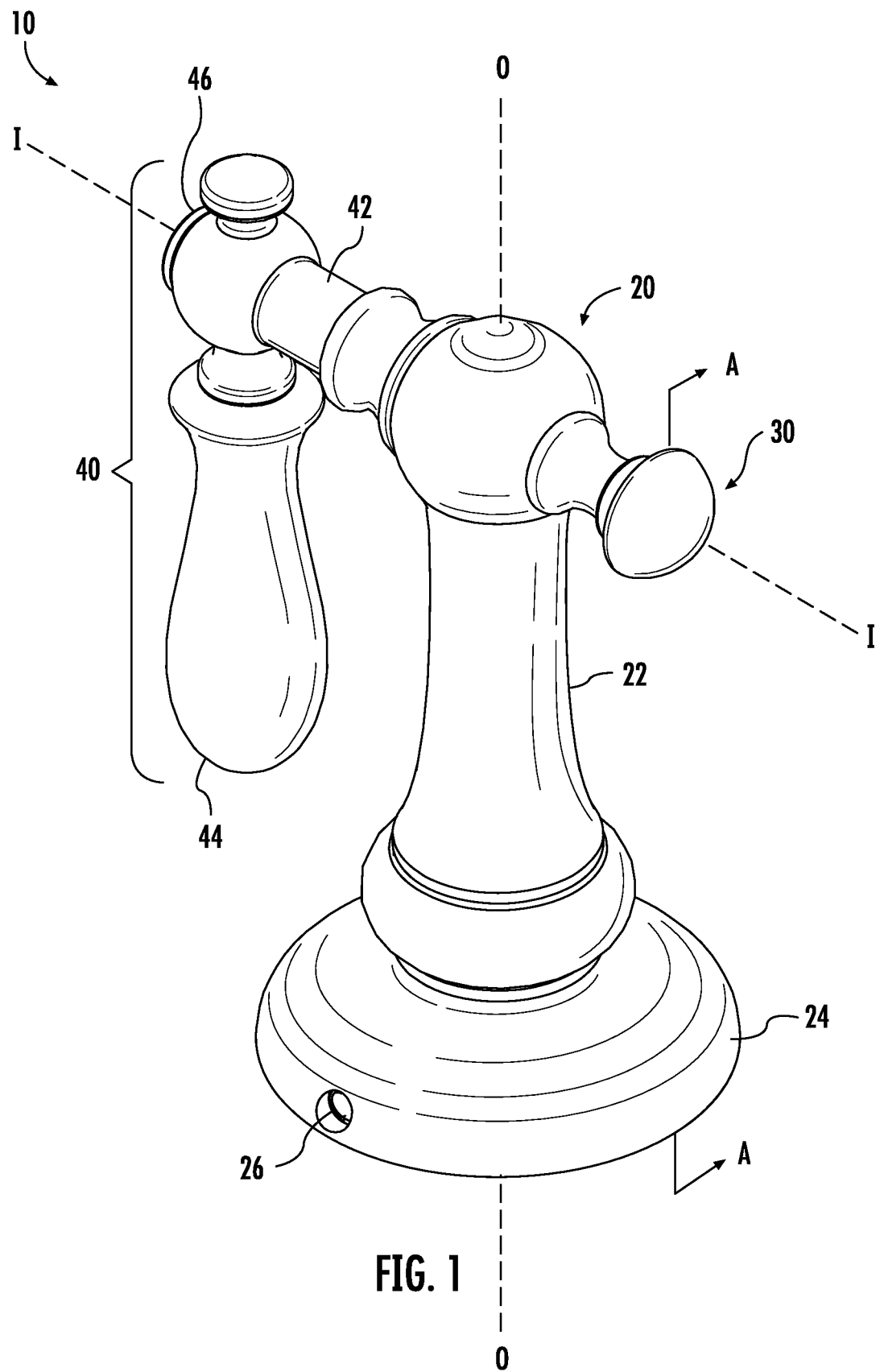
FIG. 1 is a perspective view of a handle assembly, shown according to an exemplary embodiment.

Referring generally to the Figures, a handle assembly 10 and components thereof are shown according to an exemplary embodiment. The handle assembly 10 allows a user to control the flow of a fluid (e.g., water) through a valve 202 (shown schematically) operatively coupled to the handle assembly 10. The handle assembly 10 may be mounted to a support surface 204 (e.g., a deck, countertop, sink, tub, etc.) (shown schematically), and the valve 202 may be located at least partially below the deck. A user can allow fluid to flow to a faucet (not shown) by actuating (e.g., articulating, rotating, etc.) the handle 40 coupled to a first or proximal end of an input shaft 52 that is shown to be substantially parallel to support surface 204. This motion is then translated through a set of gears 58, 78 to an output shaft 72 that is interconnected to a valve stem 206 (shown schematically), and in turn operates the valve 202. Locating the valve 202 at least partially below the deck facilitates a smaller handle assembly 10, thereby reducing material cost and increasing possible aesthetic designs.

Before discussing further details of the handle assembly and/or the components thereof, it should be noted that references to "front," "back," "rear," "upward," "downward," "inner," "outer," "right," and "left" in this description are merely used to identify the various elements as they are oriented in the FIGURES. These terms are not meant to limit the element which they describe, as the various elements may be oriented differently in various applications.

It should further be noted that for purposes of this disclosure, the term "coupled" means the joining of two members directly or indirectly to one another. Such joining may be stationary in nature or moveable in nature and/or such joining may allow for the flow of fluids, electricity, electrical signals, or other types of signals or communication between the two members. Such joining may be achieved with the two members or the two members and any additional intermediate members being integrally formed as a single unitary body with one another, or with the two members, or the two members and any additional intermediate members being attached to one another. Such joining may be permanent in nature or alternatively may be removable or releasable in nature.

Figure 2:
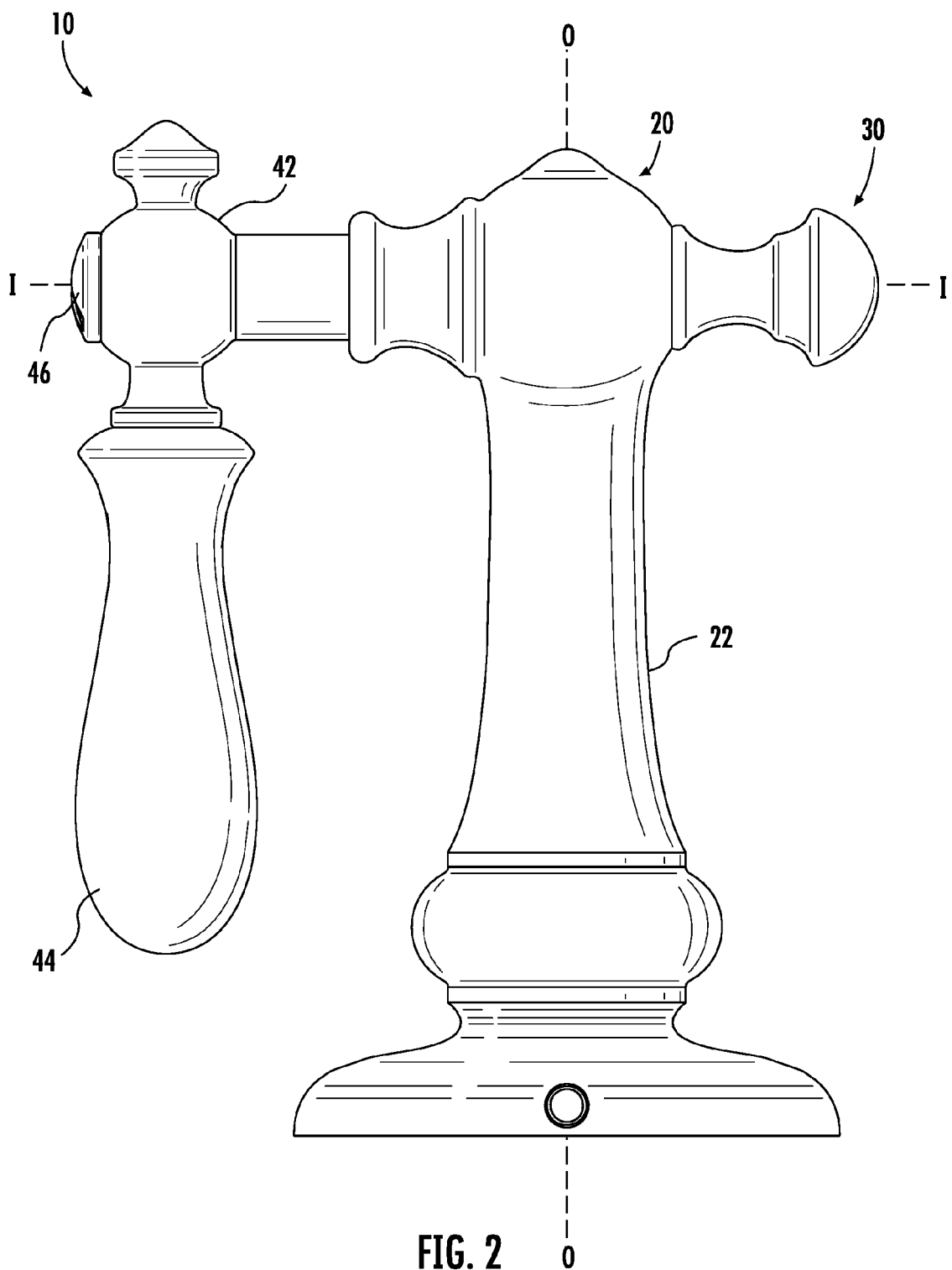
FIG. 2 is a front elevation view of the handle assembly of FIG. 1, shown according to an exemplary embodiment.

Referring to FIGS. 1 and 2, a handle assembly 10 is shown, according to an exemplary embodiment. The handle assembly 10 includes a body assembly 20, and an end cap assembly 30, and a handle 40. The body assembly 20 supports the end cap assembly 30 in the handle 40. The handle 40 is shown to include a hub 42, which may support a grip 44 and an end plug 46.

The handle assembly 10 allows a user to control the flow of water through a valve 202 (shown schematically in FIG. 3) coupled to the handle assembly 10. The valve may be a volume control valve, for example, a hot or cold water valve of a widespread lavatory faucet. In such an embodiment, the other handle assembly may be oriented in a mirror image of the handle assembly shown. According to other embodiments, a first handle assembly may be coupled to a valve configured to control volume, and a second handle assembly may be coupled to a valve configured to control temperature. According to another embodiment, the handle assembly may be coupled to a series sequential valve configured to control both volume and temperature. According to another embodiment, the handle assembly 10 may be oriented such that the handle 40 is located toward the user (e.g., toward a front edge of the support surface), and the grip 44 may be oriented substantially parallel to the support surface when the valve coupled to the handle assembly is in a closed position. Such an orientation may not require twisting of the user's wrist, which may facilitate actuation by disabled users.

Figure 3:
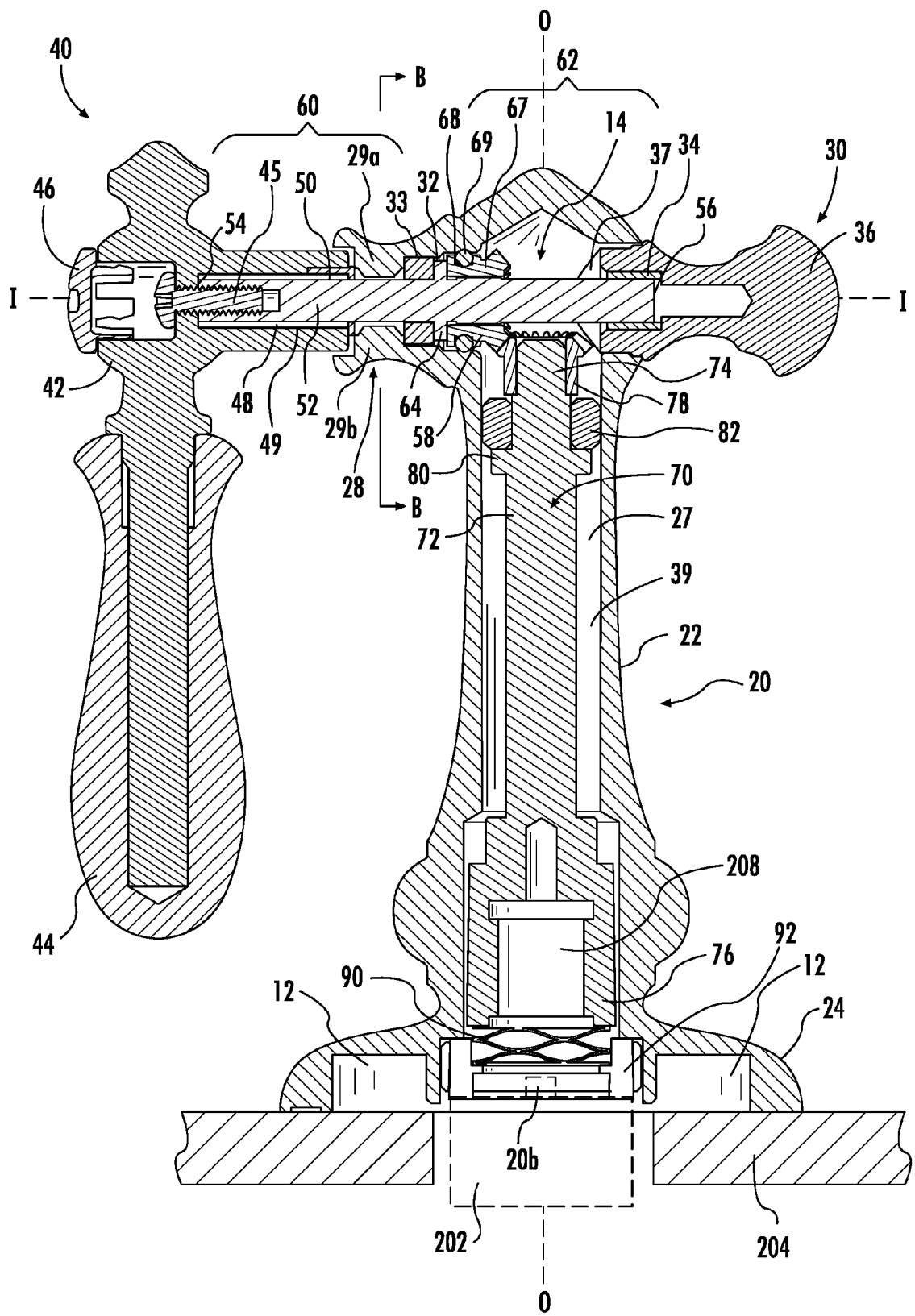
FIG. 3 is a section view through line A-A of FIG. 1, shown according to an exemplary embodiment.
Figure 4:
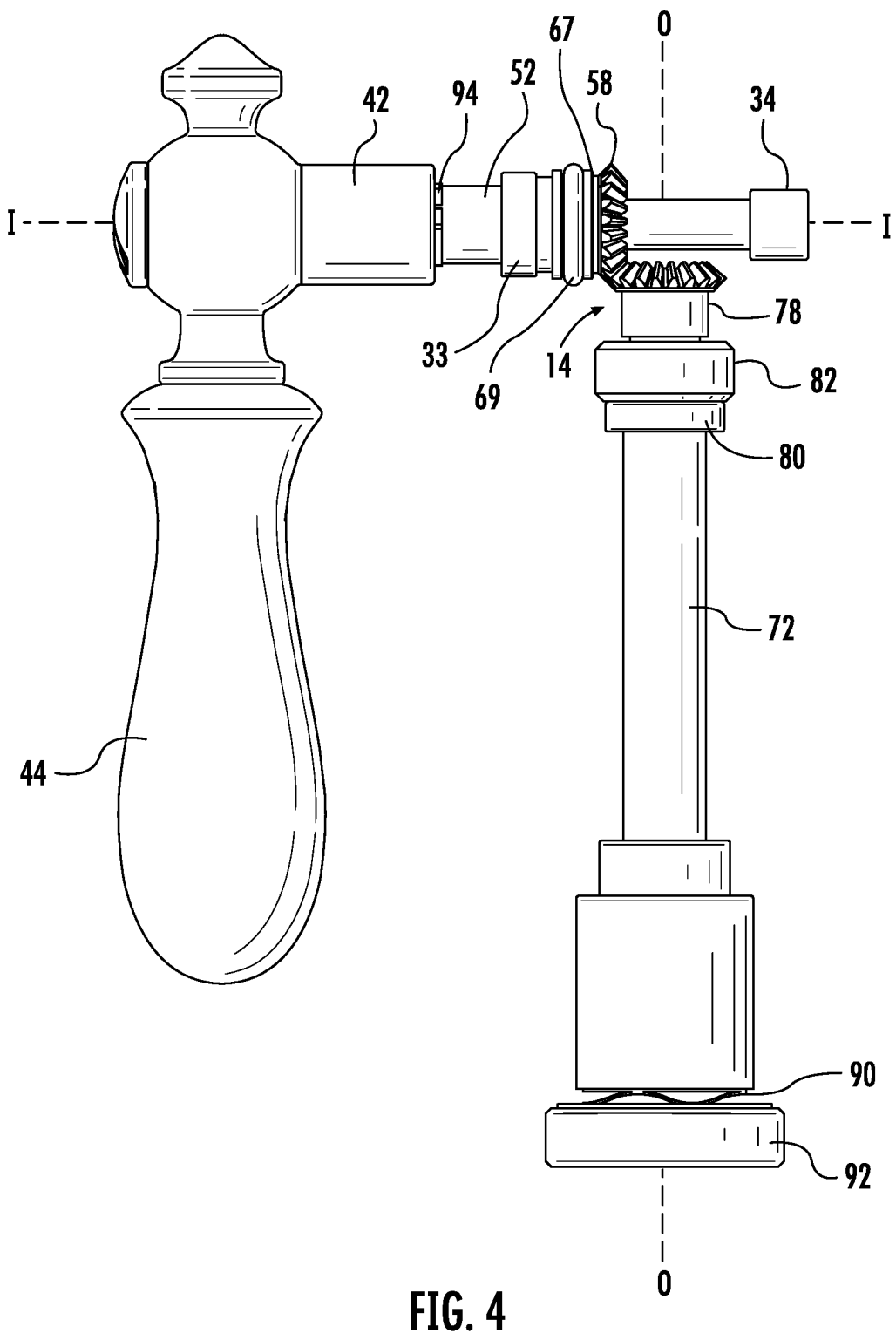
FIG. 4 is a front elevation view of the handle assembly of FIG. 1 having the body and end cap removed, shown according to an exemplary embodiment.

Further referring to FIGS. 3 and 4, partial views of the handle assembly of FIG. 1 are shown, according to an exemplary embodiment. The body assembly 20 includes a body 22 having a base 24 at a first or bottom end of the body 22, the base 24 being configured for mounting on a support surface 204 (e.g., a deck, countertop, sink, tub, etc.). A setscrew may be received in an opening 26 of the base 24 for securing the body 22 to the support surface, for example, by engaging an anchor 12. The body 22 defines a cavity 27 that is shown to include a first bore 37 intersecting a second bore 39, and that at least partially receives an input shaft assembly 50 and an output shaft assembly 70.

The input shaft assembly 50 includes a first shaft (e.g., first horizontal shaft, transverse shaft etc.), shown as an input shaft 52, having a first or proximal end 54 that is coupled to the handle 40, and a second or distal end 56 that is shown supported by a bearing or bushing 34 in an end cap 36 of the end cap assembly 30. The input shaft 52 at least partially defines a first or input axis I, that according to the exemplary embodiment shown, extends through the first bore 37 and substantially parallel to the support surface 204. The input shaft assembly 50 further includes a first or input gear 58 coupled to the input shaft 52. The input gear 58 engages a second or output gear 78 that is coupled to an output shaft 72 (e.g., vertical shaft, valve shaft, etc.) of the output shaft assembly 70.

The input gear 58 and the output gear 78 are both shown to be bevel gears forming a gearset 14. According to other embodiments, the gearset 14 may include more than two gears, the gears may be different types or sizes of gears, and the gearset 14 may be or include other types of gearsets (e.g., straight bevel gears, spiral bevel gears, worm gears, hypoid gears, etc.).

A small gearset 14 (e.g., gears having smaller pitch diameters) is preferred, thereby allowing a smaller body 22, in turn reducing material cost and increasing possible aesthetic designs. Counter this, a greater number of teeth are preferred. According to the embodiment shown, the input gear 58 and the output gear 78 each have twenty teeth. The gears 58, 78 may be formed of any suitable material. However, using a stronger material allows for smaller gears (e.g., gears having a smaller pitch diameter) having more teeth, thereby distributing loads over more teeth, thus increasing operating life of the gearset 14. In the exemplary embodiment, the gears 58, 78 are formed of 440C stainless steel, which provides corrosion resistance and the strength necessary to handle loads to which the smaller gears are subjected to over the course of their lives. As discussed in more detail below, a spring 90 may be used to push the gears 58, 78 together, thereby moving the point of contact of the gears 58, 78 towards the root of the gears 58, 78. Moving the point of contact towards the root reduces the moment arm of the force on the gear tooth, thereby increasing the durability of the gear and facilitating use of smaller, high-tooth-count gears.

The input shaft 52 codes a first portion 60 having a non-circular (or other than circular) cross-section and a second portion 62 having a substantially circular cross-section. According the exemplary embodiment shown, the first portion 60 and the second portion 62 are separated by a radially extending flange 64. The cross-section of the first portion 60 may be of any suitable shape. According to one embodiment, the cross-section of the first portion 60 may be substantially circular with a segment removed. According to other embodiments, the cross-section of the first portion 60 may be substantially rectangular or rectangular with rounded edges.

Figure 5:
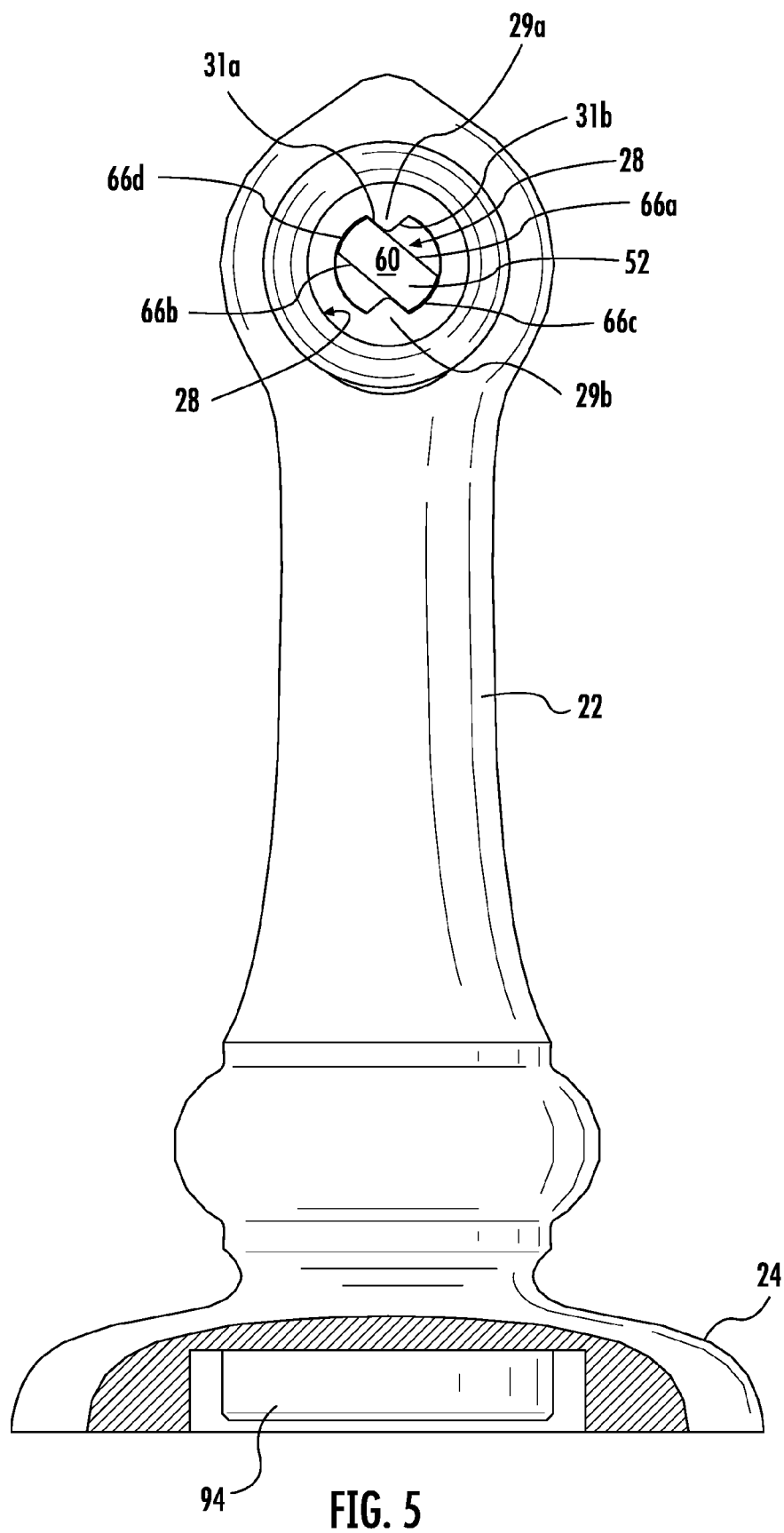
FIG. 5 is a section view through line B-B of FIG. 3, shown according to an exemplary embodiment.

Referring to the exemplary embodiment shown in FIG. 5, the first portion 60 has first through fourth sides 66a-d, generally referred to as side 66. First side 66a and second side 66b are shown to be substantially flat and opposite one another. Third side 66c and fourth side 66d are also opposite one another and each extend in an arc between the first side 66a and the second side 66b. As shown, the third and fourth sides 66c, 66d are segments of a common circle.

The body assembly 20 further includes a bearing surface 28 configured to support the first portion 60 of the input shaft 52. According to one embodiment, the bearing surface 28 may be coupled to the body 22. According to the embodiment shown, the bearing surface 28 has a substantially circular cross-section, formed or machined in the body 22, interrupted by at least one protrusion (e.g., stop, log, boss, etc.), shown as first key 29a and second key 29b generally referred to as key 29. The circular or arc portions of the bearing surface 28 are configured to have a sliding fit with the third and fourth sides 66c, 66d of the first portion 60. Accordingly, the bearing surface 28 acts as a bearing or bushing, allowing rotation of the input shaft 52 while inhibiting radial movement of the input shaft 52.

The key 29 is shown to have a wedge shape having a first slope 31a and a second slope 31b the having an angle therebetween. According to the embodiment shown in FIG. 5, when the handle 40 is rotated fully in a first or clockwise direction (e.g., rotated to an off position), the first side 66a of the first portion 60 of the input shaft 52 abuts against the first slope 31a of the key 29a, and the second side 66b abuts against the second key 29b, thereby stopping rotation of the input shaft 52. When the handle 40 is rotated fully in a second or counterclockwise direction (e.g., rotated to a fully on position), the first side 66a of the first portion 60 of the input shaft 52 abuts against the second slope 31b of the key 29a, and the second side 66b abuts against the second key 29b, thereby stopping rotation of the input shaft 52.

According to the exemplary embodiment shown, the angle between the first slope 31a and the second slope 31 b of the key 29 is approximately 100 degrees, which is slightly greater than the operational rotational angle (e.g., 90 degrees between hard stops) of the valve 202. In other words, the angle of the key 29 limits rotation of the input shaft 52 to about 80 degrees, which is within the window of the internal hard stops in the valve 202. Accordingly, the interaction of the first portion 60 of the input shaft 52 and the keys 29 act as hard stops, thereby preventing excessive or extraneous loads from being applied to the gearset 14 or to the valve 202. According to other embodiments, the angle between the slopes of the key 29 may be of a different angle, thereby allowing greater or lesser rotation of the input shaft 52, but the angle between the slopes of the key 29 may be selected to prevent the angle of operation of the handle assembly 10 from exceeding the angle of operation of the valve 202. According to another embodiment, the gear ratio between input gear 58 and output gear 78 may be selected such that the operable angle of rotation of the input shaft 52 only causes an angle of rotation of the output shaft 72 that is less than the window of the internal hard stops of the valve 202. According to another embodiment, the bearing surface 28 and the at least one key 29 may be formed in the end cap 36 of the end cap assembly 30. In a variant of this embodiment, the end cap 36 may be formed as an integral part of the body 22 of the body assembly 20. According to another embodiment, the bearing surface 28 and the at least one key 29 may be formed along the first bore 37 such that the key 29 interacts with a noncircular portion of the output shaft 72. Such an embodiment may allow excessive loading on the gearset 14, or prevent excessive loads from being applied to the hard stops of valve 202.

The body 22 may be formed of any suitable material. Forming the body 22 as a single, unitary piece reduces assembly variance, thereby providing better mesh between the input gear 58 and the output gear 78. Forming the body 22 of a strong material enables the keys 29 to be formed as part of the body 22. According to an exemplary embodiment, the body 22 may be forged from solid brass to provide a strong, unitary body that is also corrosion resistant.

Returning to FIGS. 3 and 4, the handle assembly 10 may further include a bearing or bushing 33 coupled to the body 22 and the first bore 37. The internal diameter of the bushing 33 is substantially equal to the circle defined by the arcs of the third and fourth sides 66c, 66d of the first portion 60 of the input shaft 52, providing a sliding fit therebetween. Accordingly, the bushing 33 may allow rotation of the input shaft 52 while inhibiting radial movement thereof. As the internal diameter of the bushing 33 provides similar radial support of the input shaft 52 as the bearing surface 28 of the body 22, it is contemplated that in various embodiments this may be redundant, and only one of the internal diameter of the bushing 33 and the bearing surface 28 need to be formed or machined to such tight tolerances.

Bushing 33 further includes a longitudinal or axial end surface 32 which abuts the flange 64 of the input shaft 52. Accordingly, the input shaft 52 may be axially restrained in one direction by the interaction of the distal end 56 of the input shaft 52 and the bushing 34 and in the other direction by the interaction of the flange 64 and the bushing 33.

According to the embodiment shown, the input gear 58 includes a hub 67 that defines a recess 68 (e.g., groove, gland, etc.). As shown, a frictional member 69 (e.g., an O-ring) may be seated in the recess 68 and frictionally engage both the hub 67 of the input gear 58 and the body 22. Accordingly, the frictional member 69 may provide a selectable resistance to rotation of the input shaft 52, thereby improving the feel during operation for the user.

Figure 6:
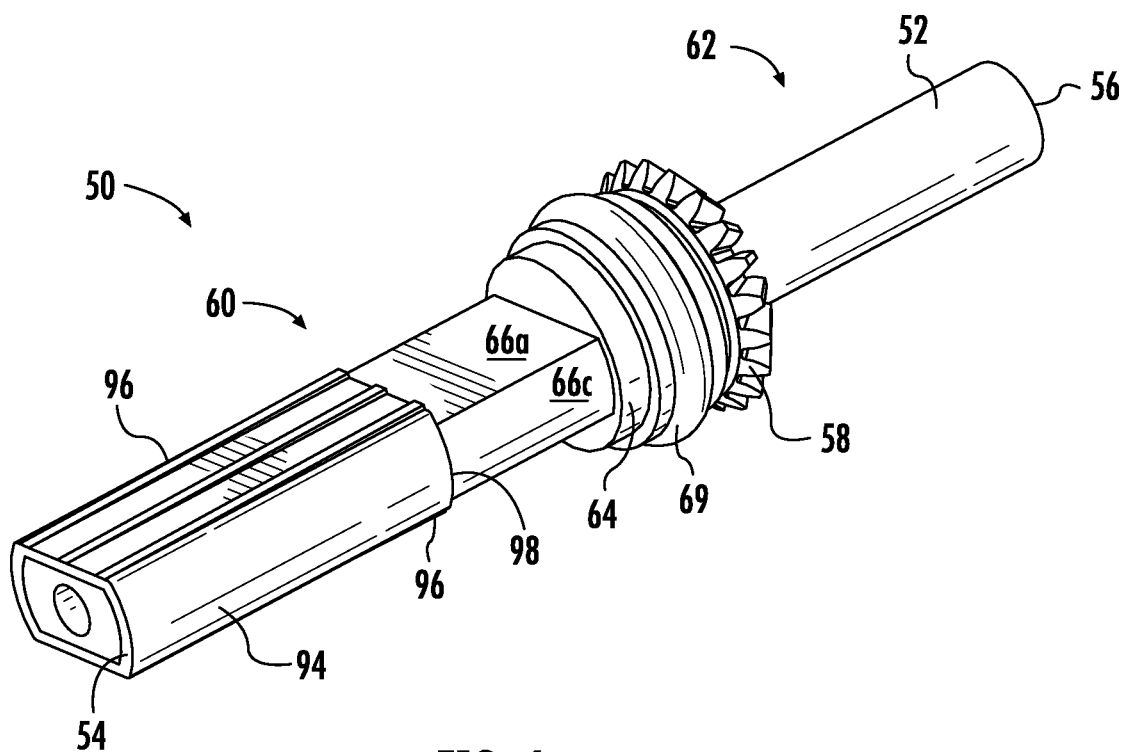
FIG. 6 is a perspective view of the input shaft assembly of the handle assembly of FIG. 1, shown according to an exemplary embodiment.
Figure 7:
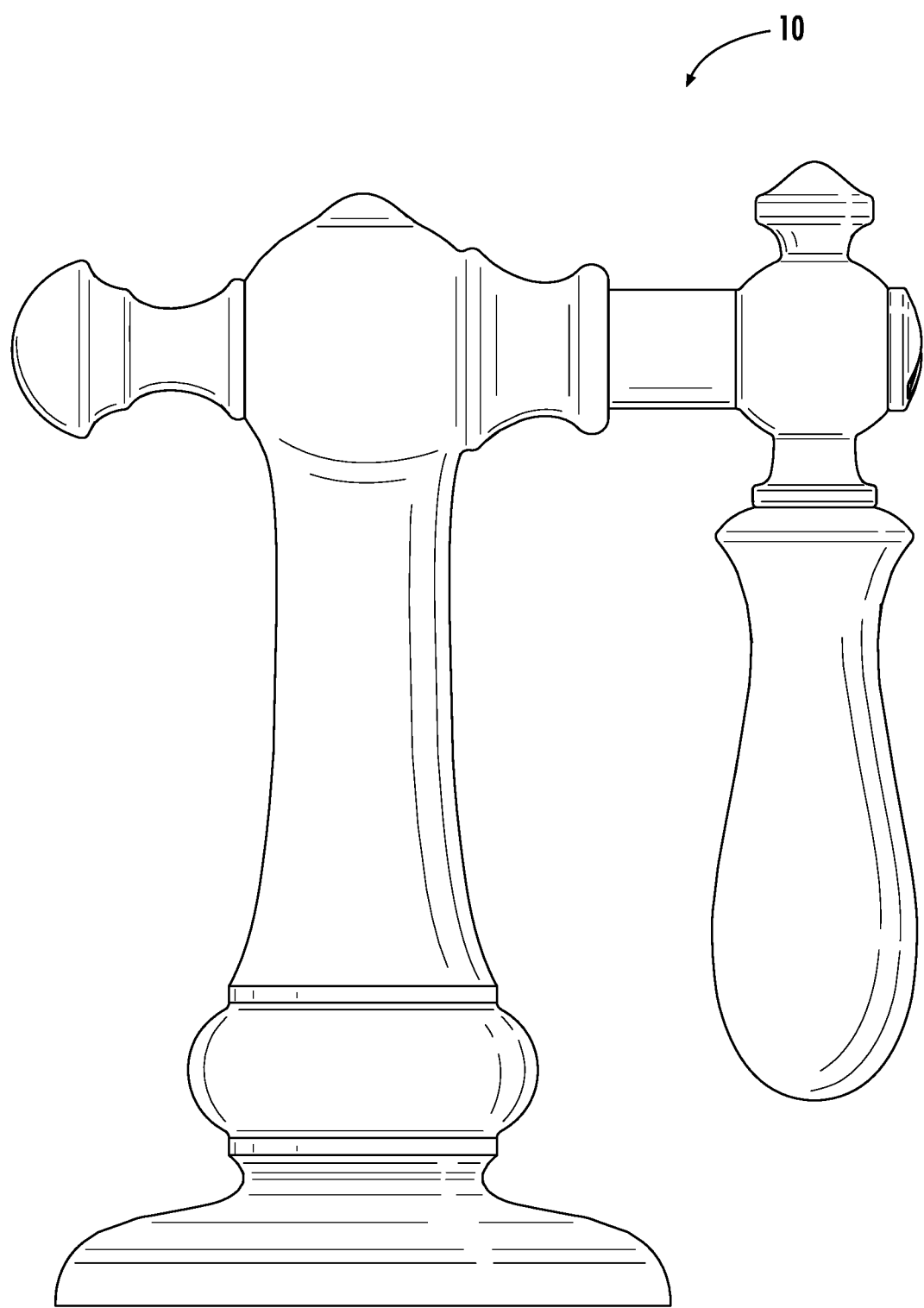
FIG. 7 is a rear elevation view of the handle assembly of FIG. 1, shown according to an exemplary embodiment.
Figure 8:
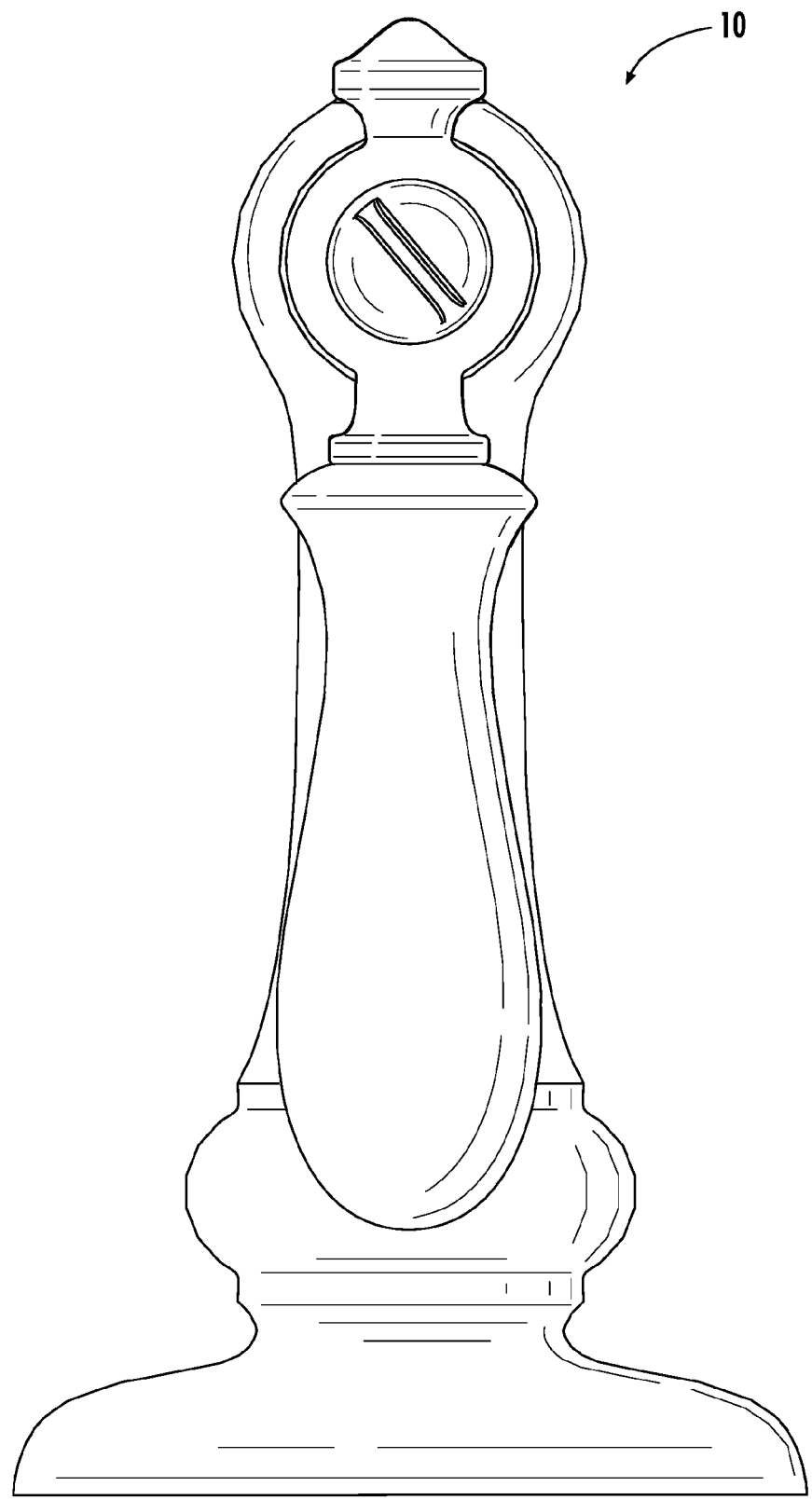
FIG. 8 is a left elevation view of the handle assembly of FIG. 1, shown according to an exemplary embodiment.
Figure 9:
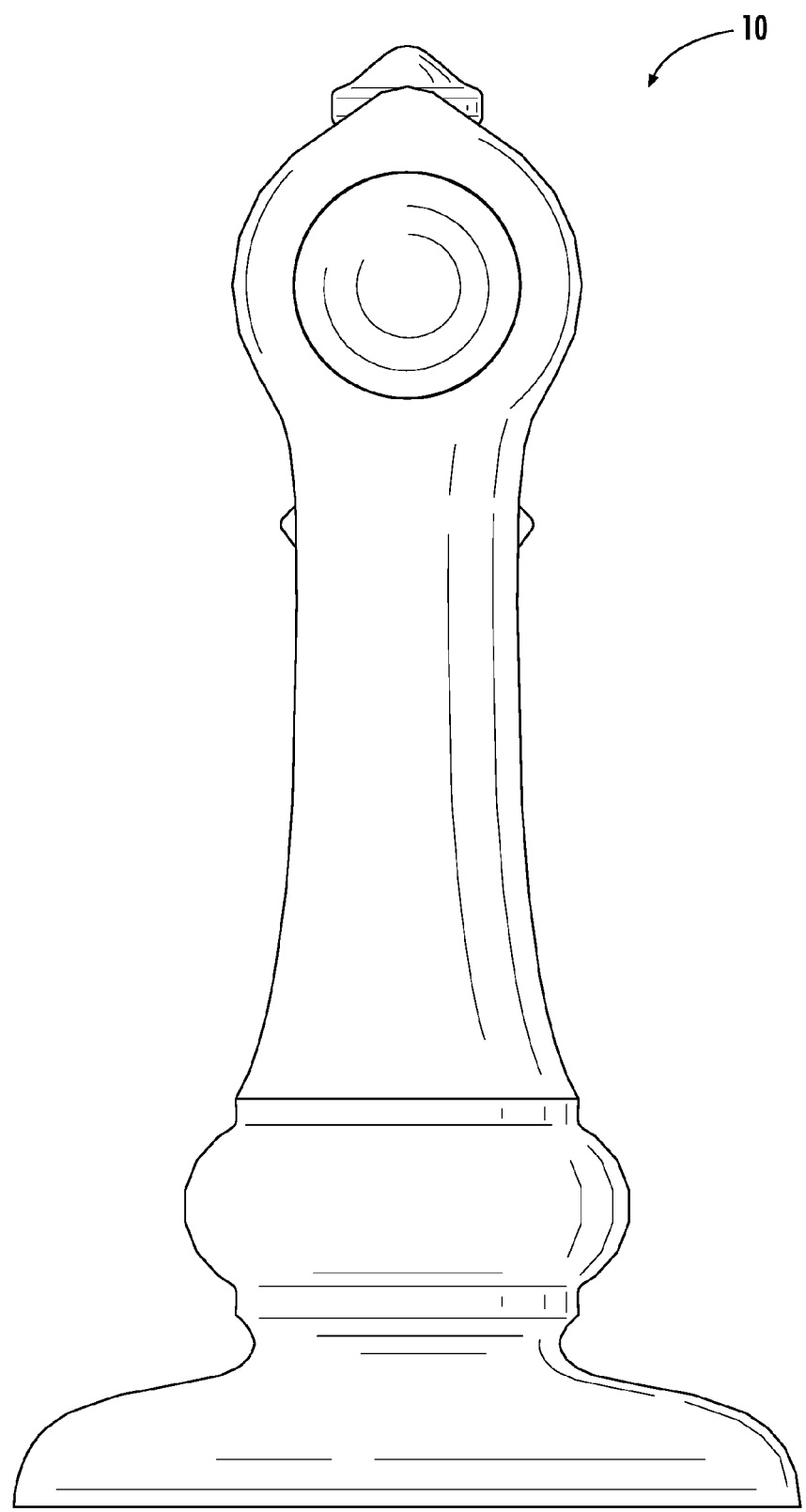
FIG. 9 is a right elevation view of the handle assembly of FIG. 1, shown according to an exemplary embodiment.
Figure 10:
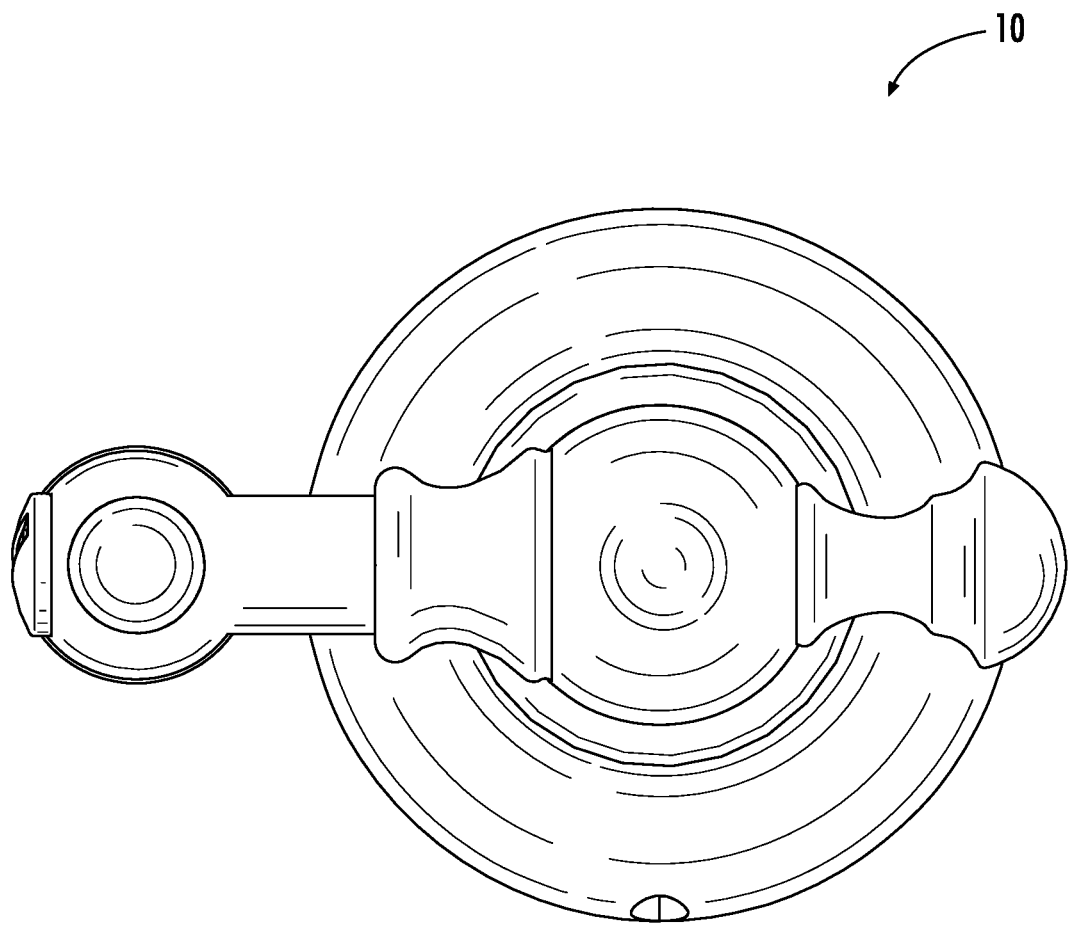
FIG. 10 is a top plan view of the handle assembly of FIG. 1, shown according to an exemplary embodiment.
Figure 11:
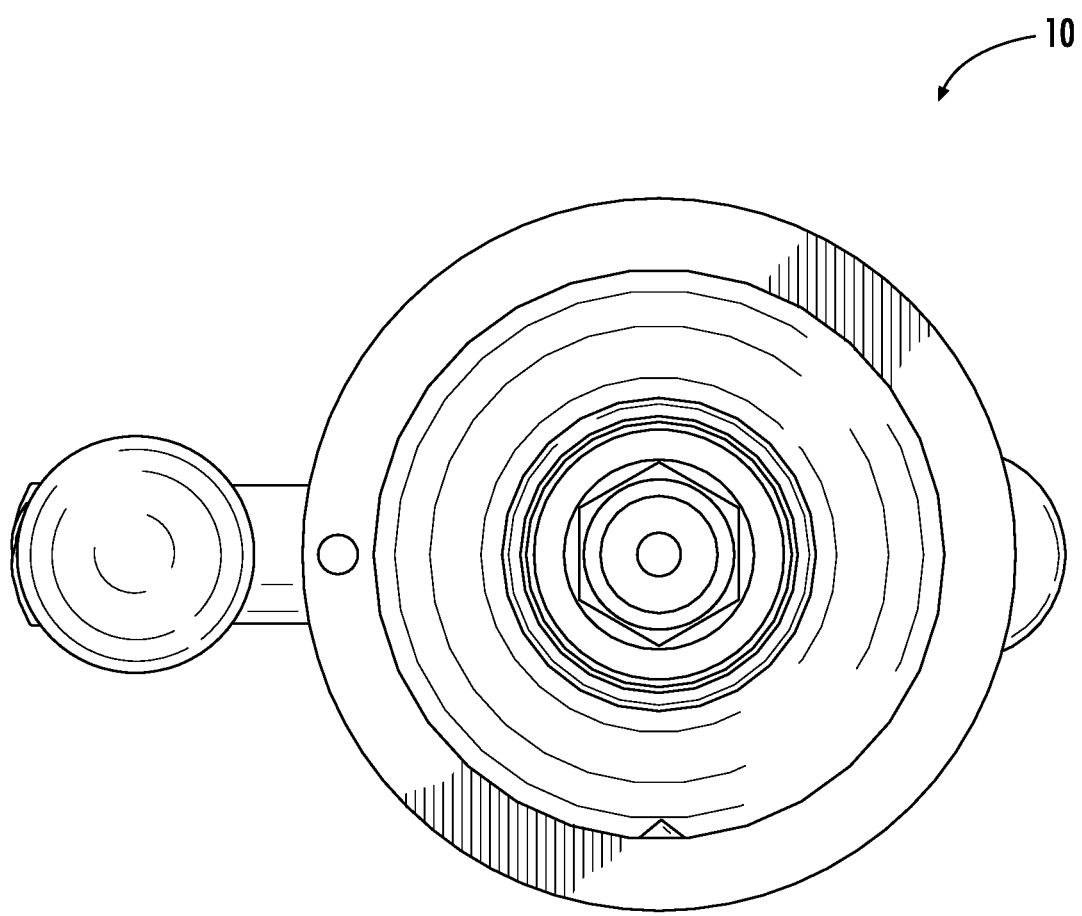
FIG. 11 is a bottom plan view of the handle assembly of FIG. 1, shown according to an exemplary embodiment.
Figure 12:
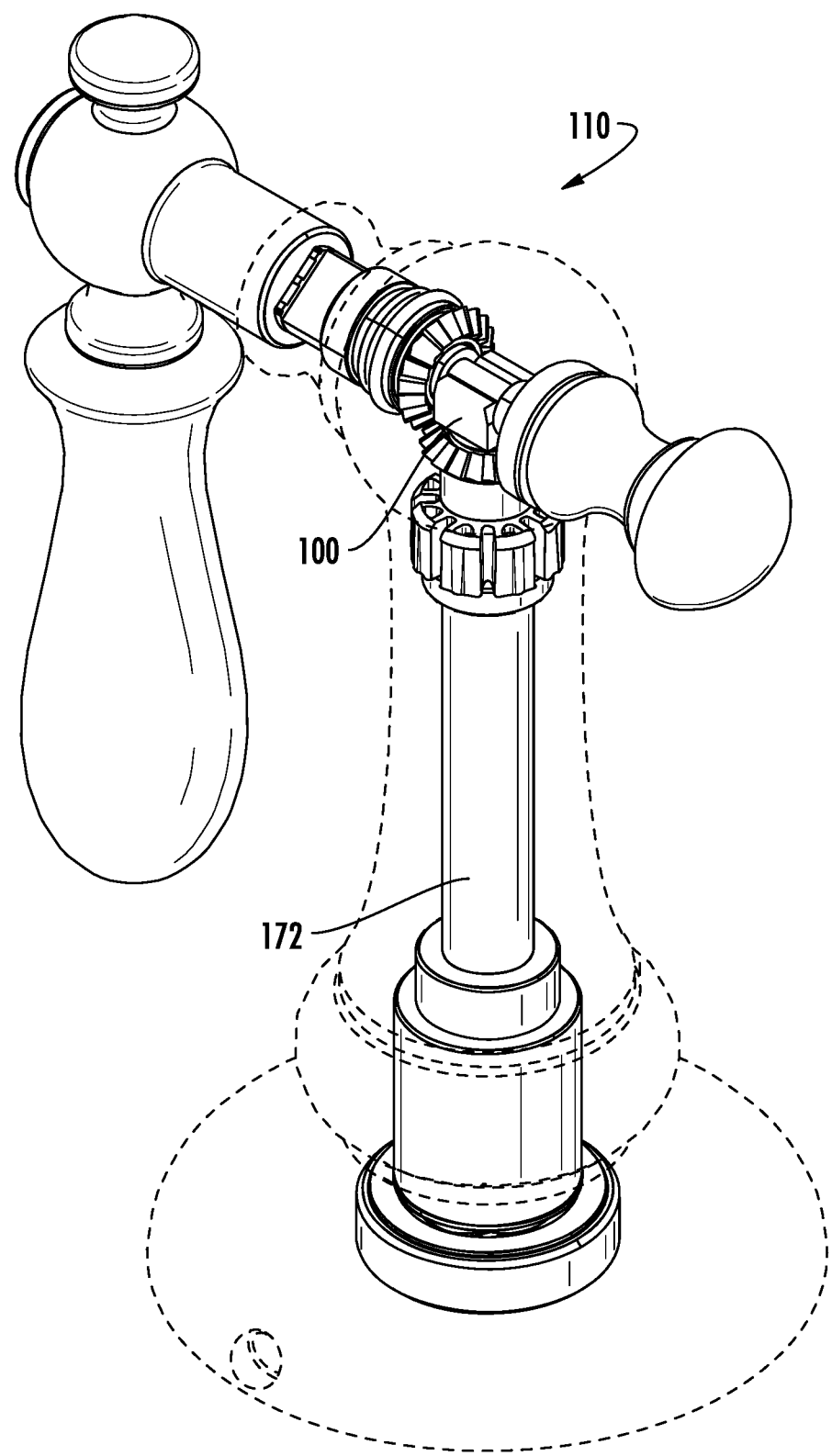
FIG. 12 is a top, front, right perspective view of a handle assembly, shown with transparent components, according to another exemplary embodiment.
Figure 13:
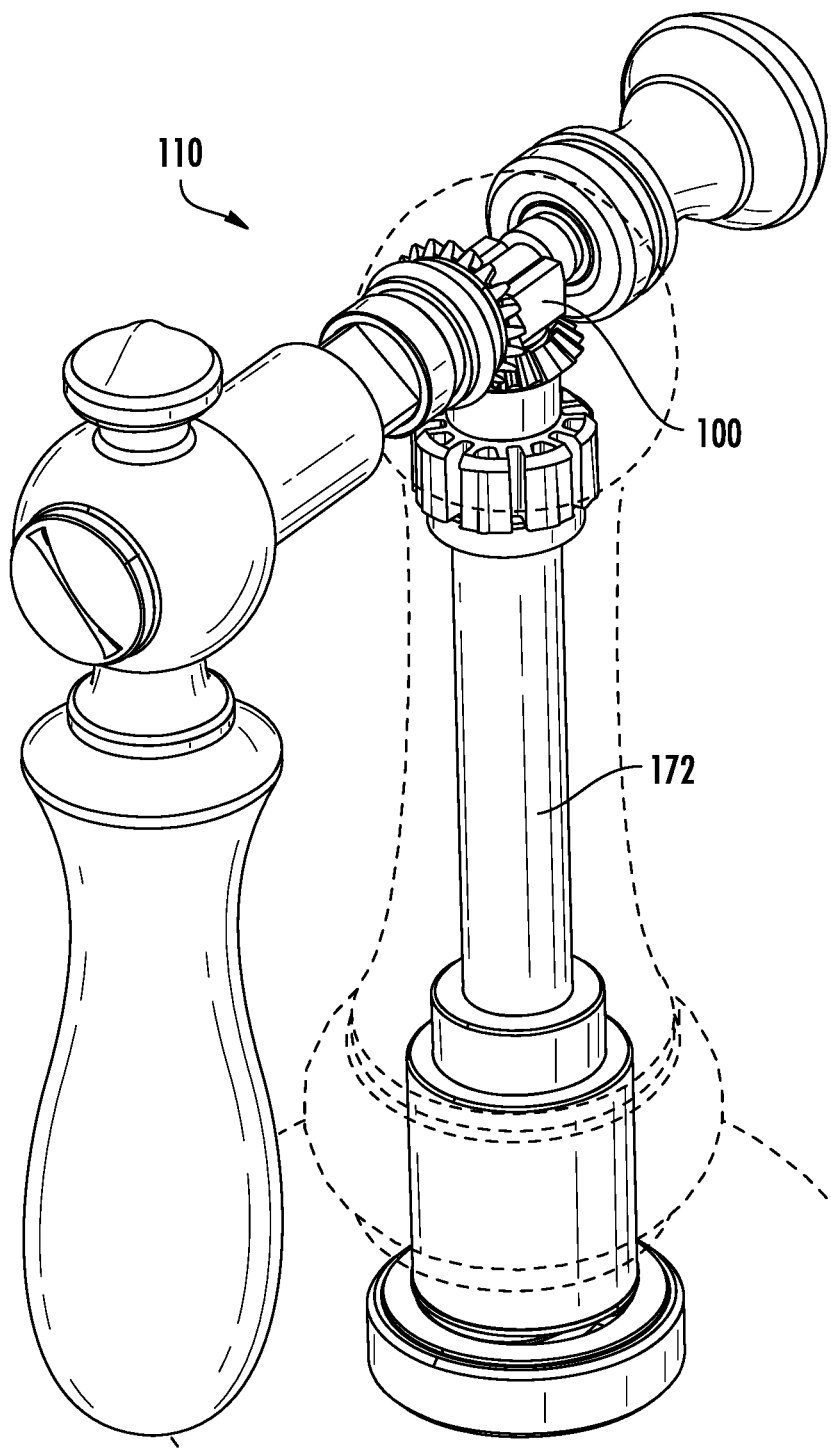
FIG. 13 is a top, front, left perspective view of the handle assembly of FIG. 12, shown with transparent components, according to an exemplary embodiment.
Figure 14:
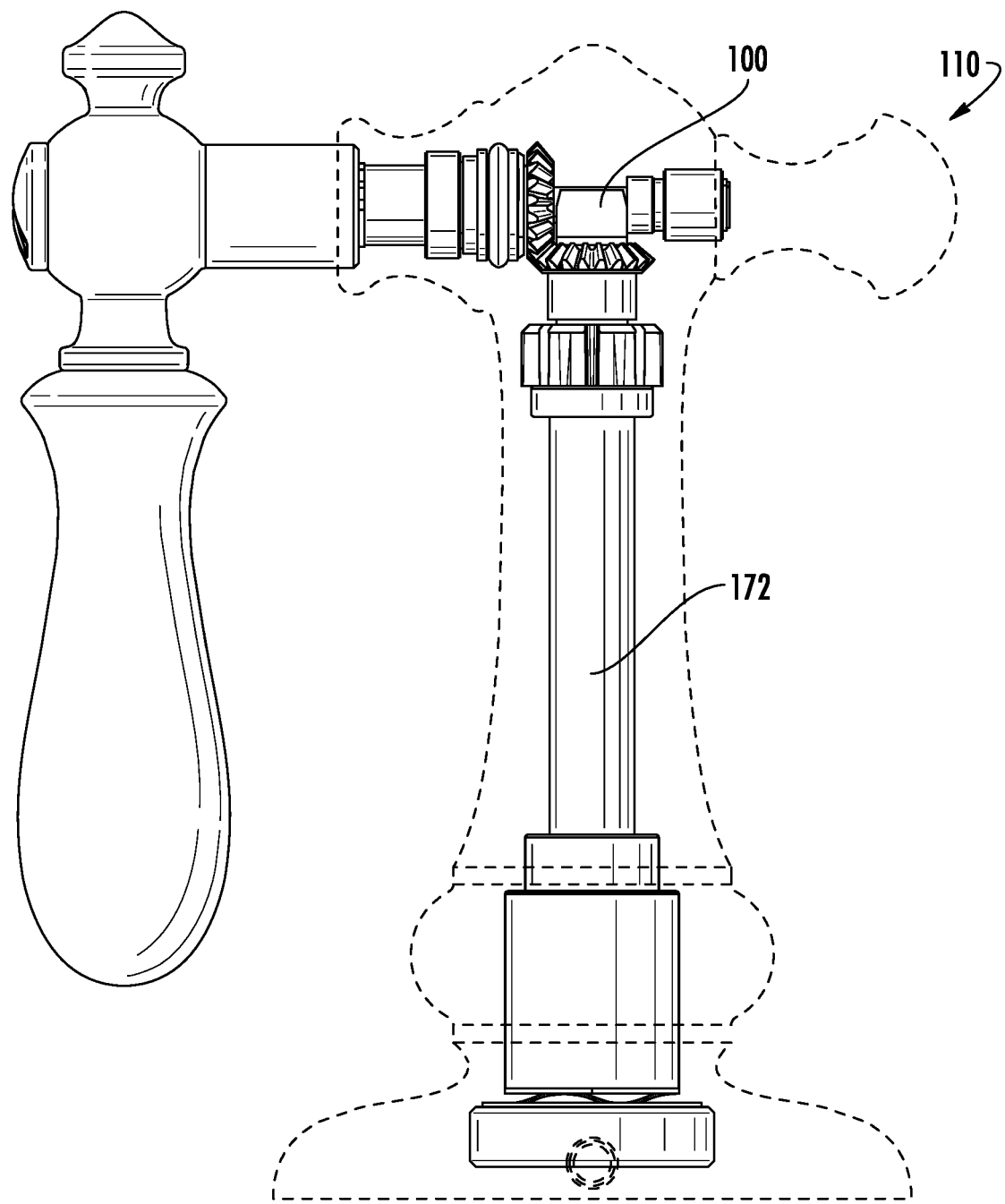
FIG. 14 is a front elevation view of the handle assembly of FIG. 12, shown with transparent components, according to an exemplary embodiment.
Figure 15:
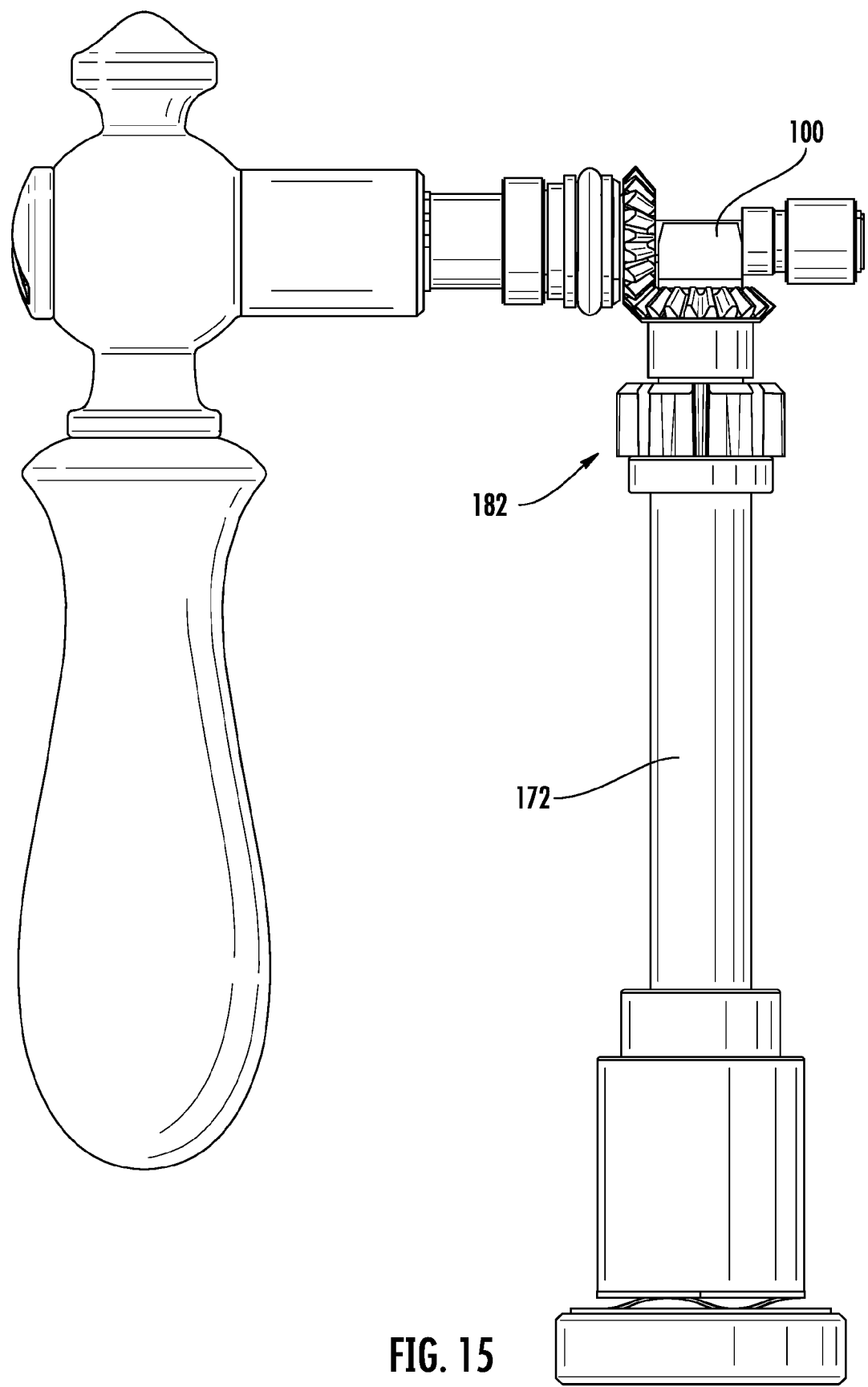
FIG. 15 is a front elevation view of the handle assembly of FIG. 12 having the body and end cap removed, shown according to an exemplary embodiment.
Figure 16:
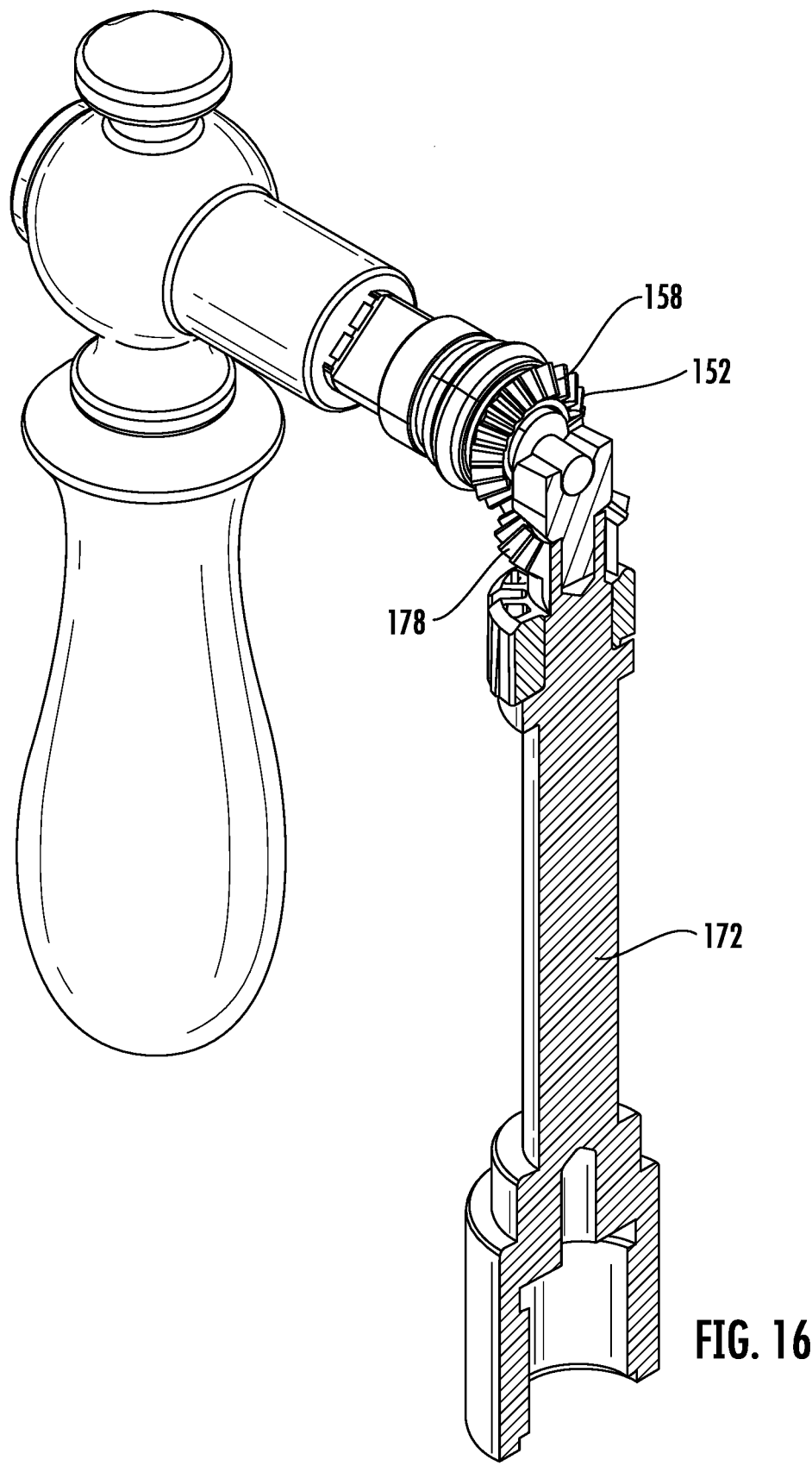
FIG. 16 is a top, front, right perspective view of the handle assembly of FIG. 12 having the body and end cap removed and sectioned through the output axis O, shown according to an exemplary embodiment.
Figure 17:
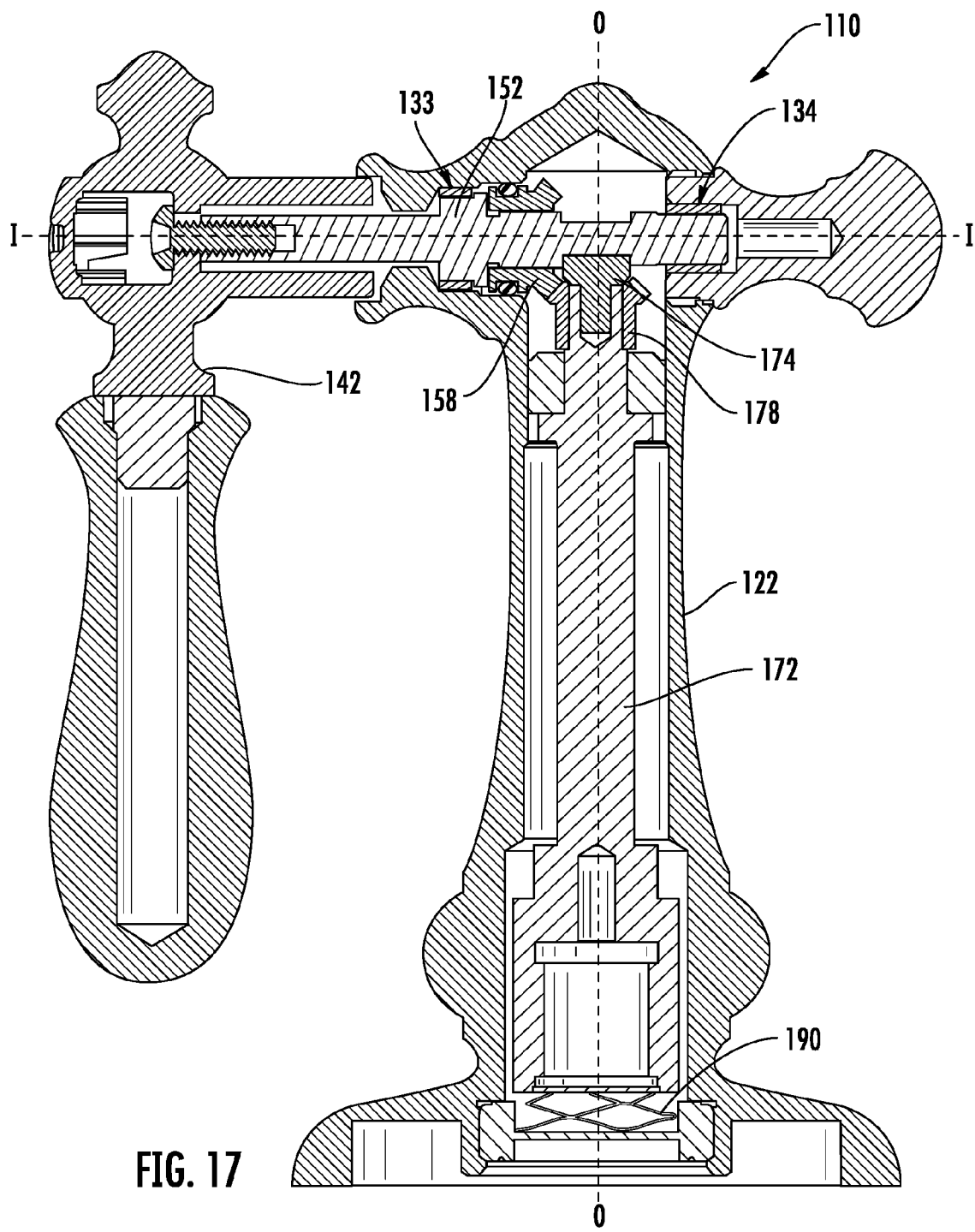
FIG. 17 is a front elevation view of the handle assembly of FIG. 12, sectioned through line A-A of FIG. 1, shown according to an exemplary embodiment.
Figure 18:
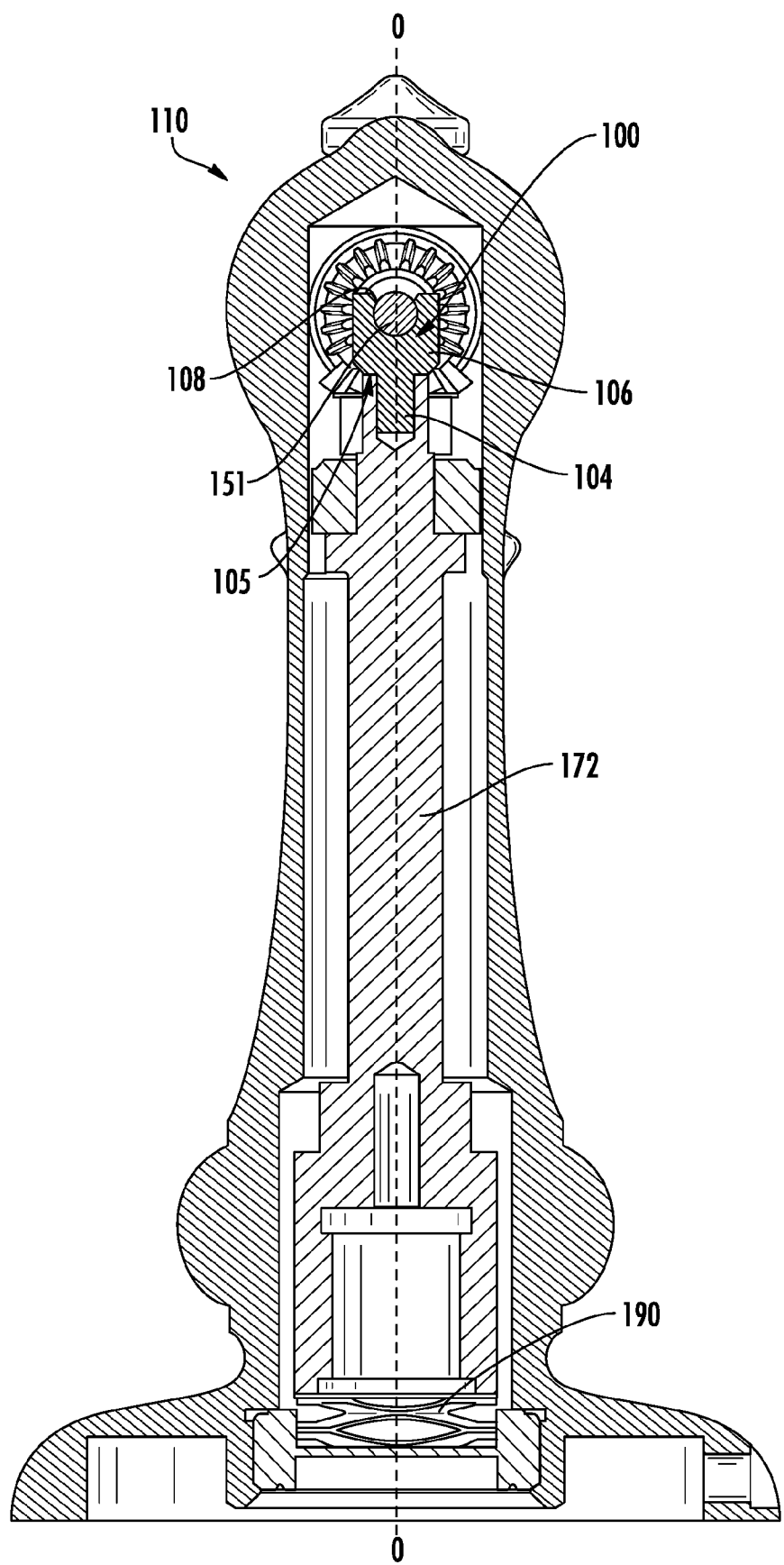
FIG. 18 is a right elevation view of the handle assembly of FIG. 12, sectioned the output axis O, shown according to an exemplary embodiment.

Further referring to FIG. 6, the input shaft assembly 50 further includes a structure 94 overmolded onto the input shaft 52 extending at least partially between the proximal end 54 and the distal end 56. According to an exemplary embodiment, the structure 94 extends from a point 98 between the proximal end 54 and the distal end 56 toward the proximal end 54. The structure 94 is configured to have an interference fit with an inner surface 48 of the hub 42 of the handle 40. According to one embodiment, the structure 94 includes at least one rib 96. According to the exemplary embodiment shown, a plurality of tapered ribs 96 decrease in height as they extend axially or longitudinally toward the proximal end 54. The ribs 96 are crushed as they are inserted into a bore 49 defined by the inner surface 48 of the handle 40, thereby providing a tight (e.g., snug, wobble-free, etc.) coupling between the handle 40 and the input shaft 52. A fastener 45 maybe used to secure the handle 40 to the input shaft 52, and a decorative end plug 46 may hide the fastener 45.

Returning to FIGS. 3 and 4, the output shaft assembly 70 includes a first or top end 74 and a second or bottom end 76. The output shaft 72 at least partially defines a second or output axis O, that according to the exemplary embodiment shown, extends substantially vertically in perpendicular to the support surface 204. According to various embodiments, the input shaft 52 and the output shaft 72 extend at angles respective to one another. According to one embodiment, the input axis I is substantially transverse to the output axis O. According to the exemplary embodiment shown, the input shaft 52 and the output shaft 72 are substantially perpendicular to one another.

The bottom end 76 of the output shaft 72 is shown to be supported by a spring 90, which in turn is supported by a retaining nut 92 coupled to the body 22. According to the embodiment shown, the retaining nut 92 serves as a platform against which the spring 90 compresses. In turn, the spring 90 applies an upward force on the output shaft 72, thereby pushing the output gear 78 into deeper engagement with the input gear 58. Deeper engagement of the gears 58, 78 provides a better user feel (i.e., reduces gear slop), produces a longer duration of tooth-to-tooth contact, and increases the durability and longevity of the gearset 14 by moving the force transfer deeper into the gear tooth.

The spring 90 may be any suitable type of spring, for example, a coil or helical spring, a cone-disc spring (Belleville washer), a cantilever spring, etc. According to the exemplary embodiment shown, the spring 90 is a wave spring. A wave spring generally allows for reduced operating heights and provides a more even distribution of forces, which may increase the tendency to align and to reduce radial or lateral loading or binding of the output shaft 72. Threadably coupling the retaining nut 92 to the body 22 facilitates adjustment of the spring force applied by the spring 90 to the output shaft 72 by tightening or loosening the retaining nut 92, thereby easing the manufacturing tolerances of the body assembly 20 and the output shaft assembly 70. Any suitable material may be used for the spring 90. Stainless steel may be preferred due to its strength, resiliency, and corrosion resistance. The spring 90 is shown to be in compression applying force to a bottom end of the output shaft 72. According to other embodiments the spring 90 may be in tension, may apply forces to a different part of the output shaft 72 (e.g., flange 80), or may apply forces to the input shaft 52.

The output shaft 72 may be directly coupled to the valve stem 206 of the valve 202, or may be interconnected thereto, for example, using an adapter 208. Using an adapter 208 may facilitate locating the valve 202 below the support surface 204, thereby enabling a smaller handle assembly 10, which reduces cost and increases aesthetic possibility.

The output shaft assembly 70 is further shown to include a bearing or bushing 82 positioned along the length of the output shaft 72. Providing a solid plastic bushing may maintain shaft concentricity while reducing bearing surface friction. A solid bushing further reduces the possibility of pinching that may occur with using a split bushing. The bushing 82 may be formed of any suitable material, for example nylon, polyethylene, or polyoxymethylene (e.g., Celcon, Delrin, Hostaform, etc.).

Referring to FIGS. 12-27, another exemplary embodiment is shown. A handle assembly 110 includes an input shaft 152 and an output shaft 172. The axis I of the input shaft 152 is shown to intersect the axis O of the output shaft 172. According to various embodiments, the input shaft 152 and/or the output shaft 172 may be formed of brass. A bearing, shown as saddle 100, is shown to interconnect the input shaft 152 and the output shaft 172 to improve the alignment of the input gear 158 and the output gear 178.

Figure 19:
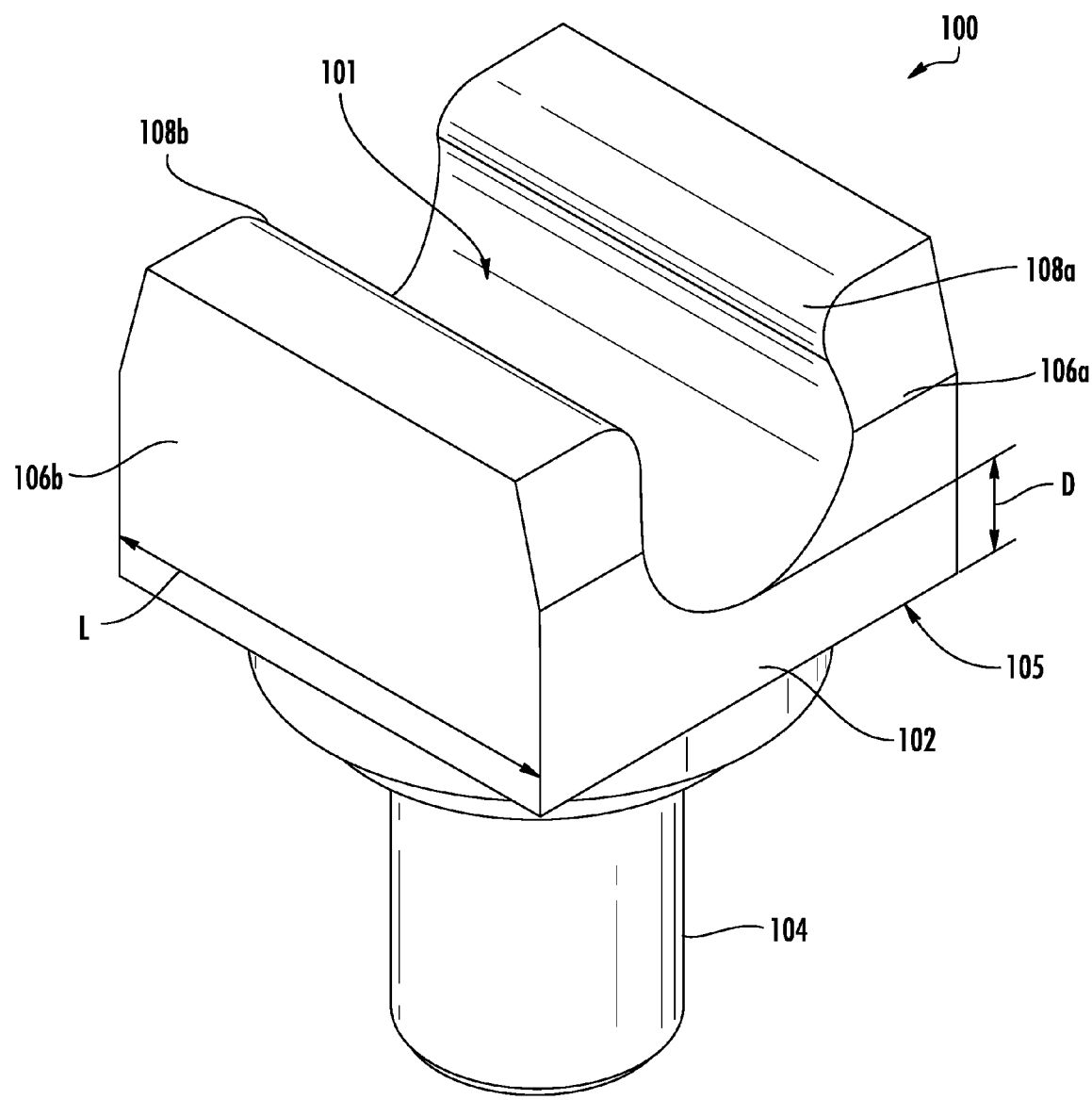
FIG. 19 is a perspective view of a saddle, shown according to an exemplary embodiment.

Referring more specifically to FIG. 19, the saddle 100 includes a body 102 and a post 104 (e.g., pin, stud, boss, protrusion, etc.) extending downward from the body 102. First arm 106a and second arm 106b (generally referred to as arms 106) are shown to extend upward from the body 102. Fingers 108a and 108b (generally referred to as fingers 108) are shown to extend inward from the first arm 106a and the second arm 106b, respectively. An axially extending channel 101 is at least partially defined by the arms 106. The channel 101 may further be defined by the fingers 108. According to the exemplary embodiment shown, the channel 101 is at least partially defined by the body 102, arms 106, and the fingers 108. The body 102, arms 106, and fingers 108 are shown to generally form a "U" shape; however, other embodiments, for example, a "C" shape, are contemplated. The saddle 100 may be formed (e.g., injection molded, machined, etc.) of any suitable, preferably low-friction, material, for example nylon, polyethylene, or polyoxymethylene (e.g., Celcon, Delrin, Hostaform, etc.).

Figure 20:
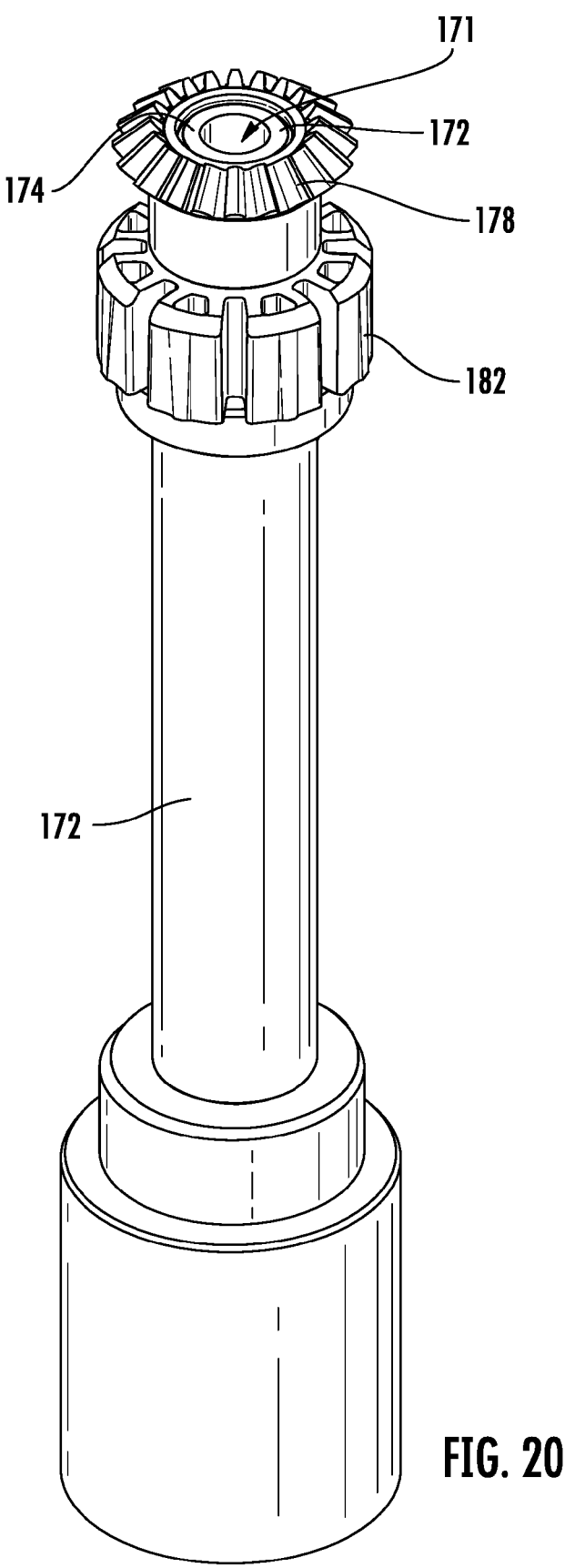
FIG. 20 is a perspective view of components of the handle assembly of FIG. 12, shown according to an exemplary embodiment.
Figure 21:
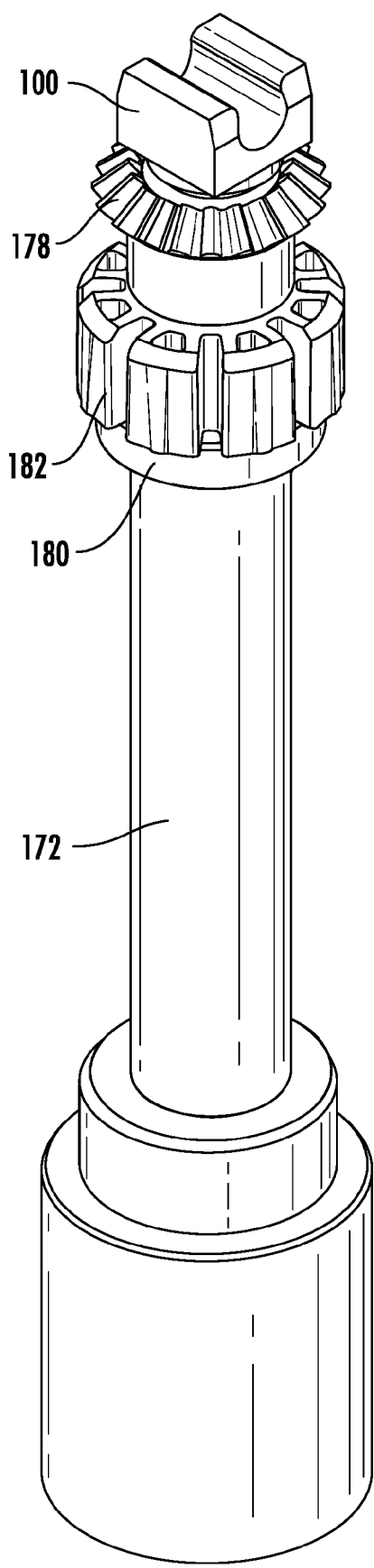
FIG. 21 is a perspective view of components of the handle assembly of FIG. 12, shown according to an exemplary embodiment.
Figure 22:
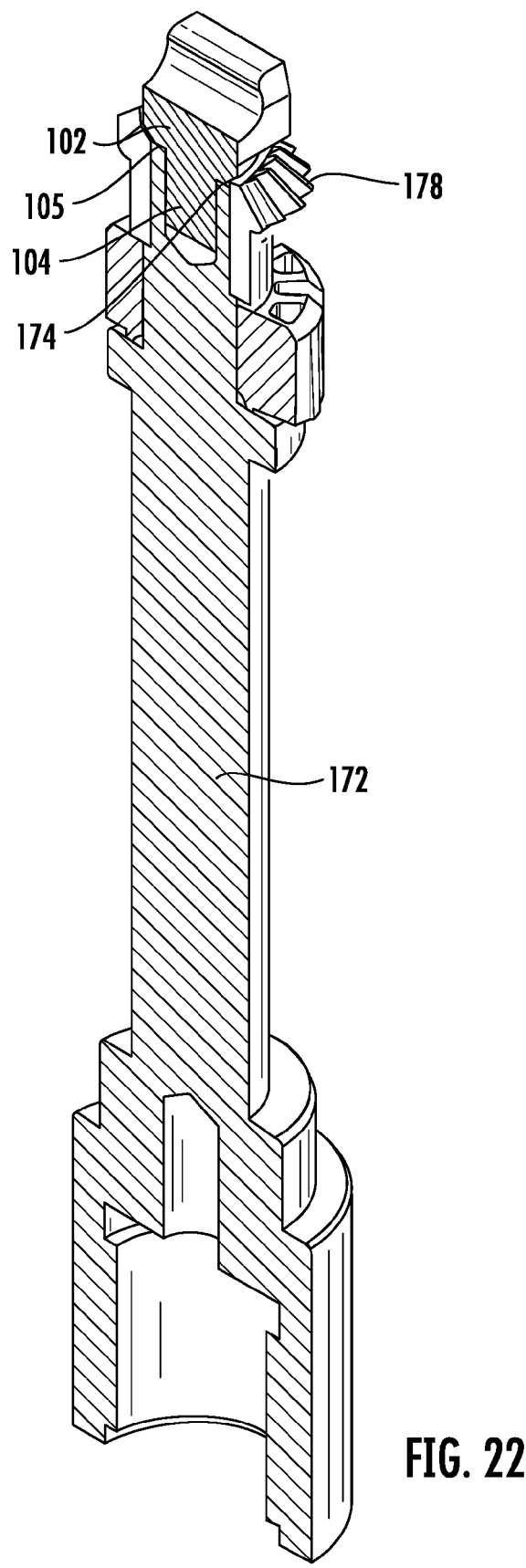
FIG. 22 is a perspective view of components of FIG. 21, sectioned through outlet axis O, shown according to an exemplary embodiment.
Figure 23:
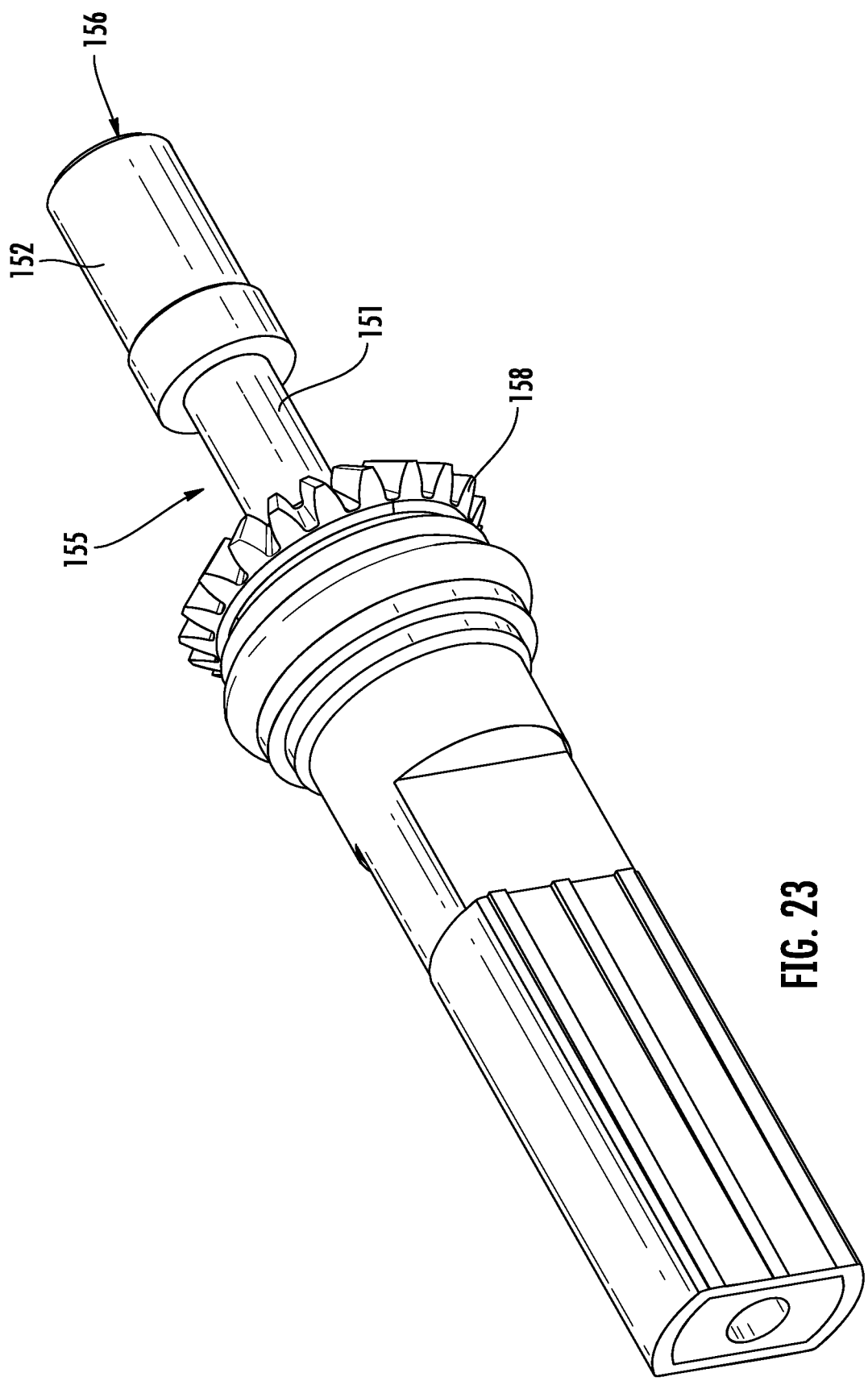
FIG. 23 is a top, front, left perspective view of the input shaft assembly of the handle assembly of FIG. 12, shown according to an exemplary embodiment.
Figure 24:
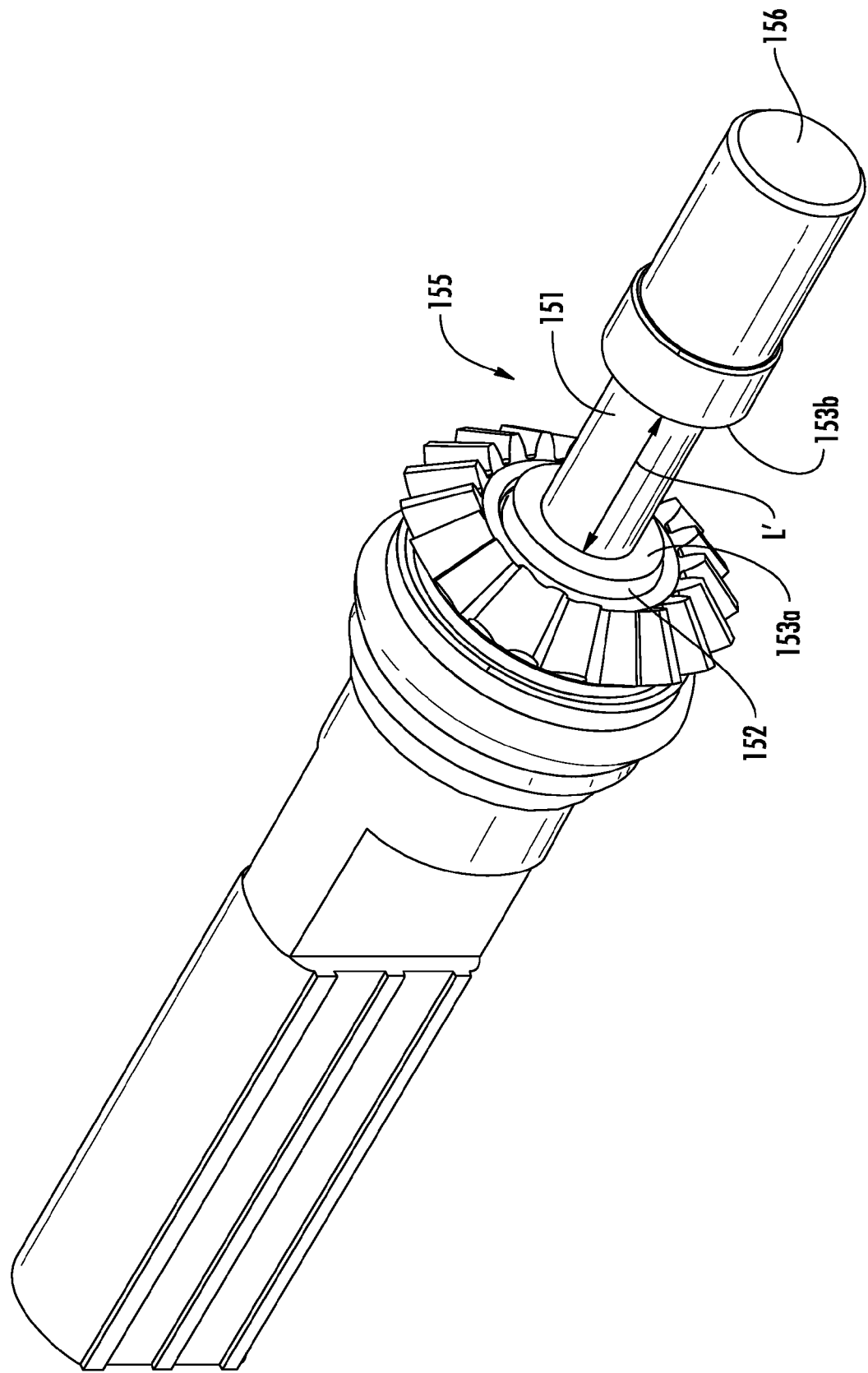
FIG. 24 is a top, front, right perspective view of the input shaft assembly of the handle assembly of FIG. 12, shown according to an exemplary embodiment.

Referring to FIGS. 20-22, the post 104 is configured to be received in a hole 171 defined by the top end 174 of the output shaft 172. During operation, the output shaft 172 will rotate relative to the saddle 100. Accordingly, the tolerance between the diameter of the post 104 and the diameter of the hole 171 should be sufficiently tight to prevent wobble, but sufficiently loose to allow for rotation (e.g., sliding fit, etc.) of the output shaft 172 relative to the post 104. It is further preferable that the post have a sufficiently long aspect ratio so as to inhibit wobble between the saddle 100 and the output shaft 172.

Referring briefly to FIGS. 28-33, according to another exemplary embodiment, the saddle 300 may not include a post. Instead, the body 304 of the saddle 300 defines a cavity 303. The output shaft 372 is shown not include a hole 371. Instead, the output shaft 372 includes a pin 373 (e.g., boss, stud, protrusion, post, etc.) extending from the top end 374 of the output shaft 372. The pin 373 is received in the cavity 303 of the saddle. The pin 373 and the cavity 303 are configured to permit rotation of the output shaft 372 relative to the saddle 300 while inhibiting wobbling between the output shaft 372 and the saddle 300.

Returning to FIGS. 23-24, the input shaft 152 may have a reduced diameter portion 151. Shoulders 153, shown as first shoulder 153a and second shoulder 153b, may be axially spaced on either end of the reduced diameter portion 151 and at least partially define a slot 155 therebetween.

Returning to FIGS. 17-18, the reduced diameter portion 151 is received in the channel 101 of the saddle 100. According to the embodiment shown, the arms 106 and the fingers 108 of the saddle 100 extend around more than half of the circumference of the reduced diameter portion 151, thereby preventing the input shaft 152 from separating from (e.g., popping out of) the saddle 100. During assembly of the exemplary embodiment, the input shaft 152 is inserted (e.g., installed, pressed, etc.) into the body 122. Then the output shaft 172, having the saddle 100 coupled thereto, is inserted into the body 122 until the saddle 100 snaps onto the reduced portion 151 of the output shaft. The tolerance between the diameter of the reduced portion 151 and the diameter of the channel 101 is preferably sufficiently tight to prevent wobble, but sufficiently loose to allow for rotation (e.g., sliding fit, etc.) of the input shaft 152 relative to the saddle 100. As shown, the arms 106 of the saddle 100 may be axially tapered so as to facilitate insertion of the saddle 100 into the slot 155 of the input shaft 152 between shoulders 153.

The spring 190 pushes the output shaft 172 towards the input shaft 152, thereby pushing the output gear 178 into engagement with the input gear 158. At a steady state, the top end 174 of the output shaft 172 pushes against a bottom surface 105 of the body 102 of the saddle. According to other embodiments, the bottom of the post 104 may be pushed by the bottom of, or a lip or ledge in, the hole 171. The bottom of the channel 101 pushes against the reduced diameter portion 151. Accordingly, the distance between the top end 174 of the output shaft 172 to the diameter of the reduced diameter portion 151 is limited to the distance D (shown in FIG. 19) between the bottom surface 105 and the bottom of the channel 101 of the saddle 100. Thus, the tolerance stackup among components is greatly reduced. Further, because the relation between the input shaft 152 and the output shaft is substantially controlled by the tolerance of the distance D on the saddle 100, the radial location of the bushings 133 and 134 are less critical, thereby reducing manufacturing costs and improving quality.

The spring 190 pushes the output gear 178 into engagement with the input gear 158, which reduces backlash between the gears, thereby providing a more satisfying feel to the user, and provides a longer duration of tooth-to-tooth contact. The saddle 100 prevents the output gear 178 and the input gear 158 from being pushed too close together, which may cause the input shaft 152, and therefore handle 142, to be dis-satisfactorily difficult to turn by a user. The user may also dis-satisfactorily feel the gear teeth if the output gear 178 and the input gear 158 are pushed too close together. Accordingly, the saddle 100 improves gear alignment by simplifying the tolerance stackup to facilitate better control of the location of the contact point between the teeth of the output gear 178 and the input gear 158.

Additionally the force of the spring 190 may be configured such that the spring force holds the output gear 178 and the input gear 158 together at rest, thereby providing increased friction, which may inhibit unintended rotation of the handle. However, as the input shaft 152 is intentionally rotated, the spring 190 may be compressed (e.g., comply, give, etc.), which allows the teeth of the output gear 178 and the input gear 158 to disengage slightly to allow point contact between the gears.

According to some embodiments, the axial length L (shown in FIG. 19) of the saddle 100, may be configured to be similar to (but slightly less than) the axial length L' (shown in FIG. 24) of the reduced diameter portion 151 between the shoulders 153a, 153b. For example, the tolerance between the length L and length L' may be a sliding fit so as to further locate the input shaft 152, and therefore the input gear 158, relative to the output shaft 172, and therefore the output gear 178. According to other embodiments, the reduced diameter portion 151 of the input shaft 152 may not have a reduced diameter (see, e.g., input shaft 52), and the channel 101 of the saddle 100 may be sized to accommodate the larger diameter.

Figure 25:
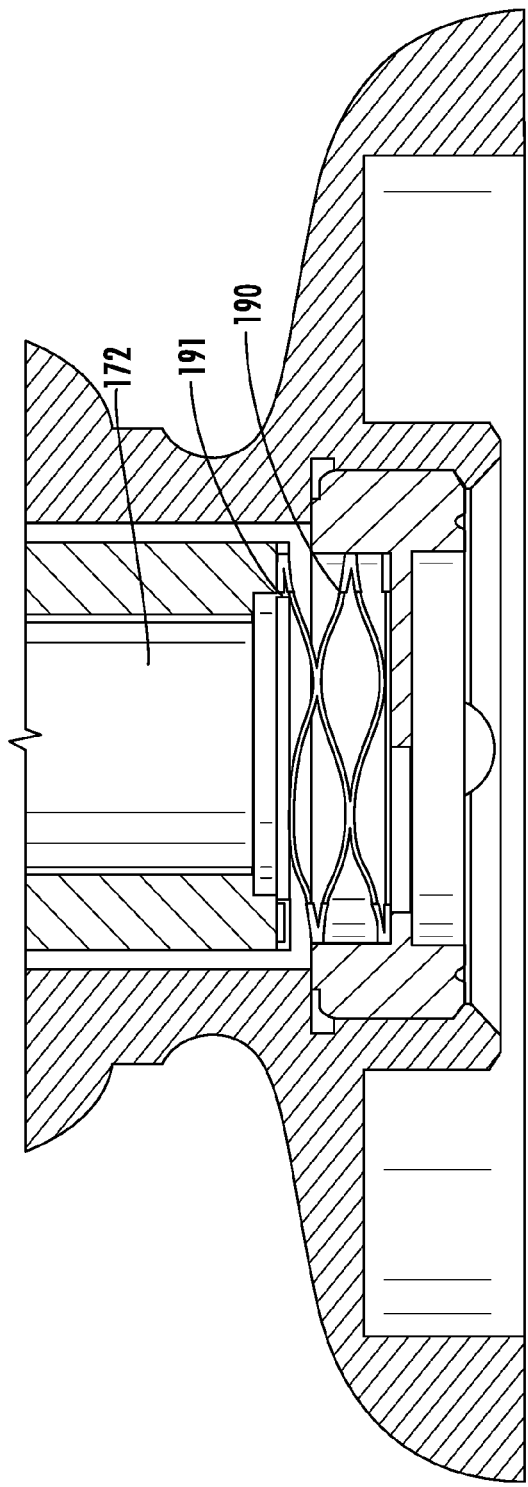
FIG. 25 is a front elevation view of a portion the handle assembly of FIG. 12 sectioned through line A-A of FIG. 1.
Figure 26:
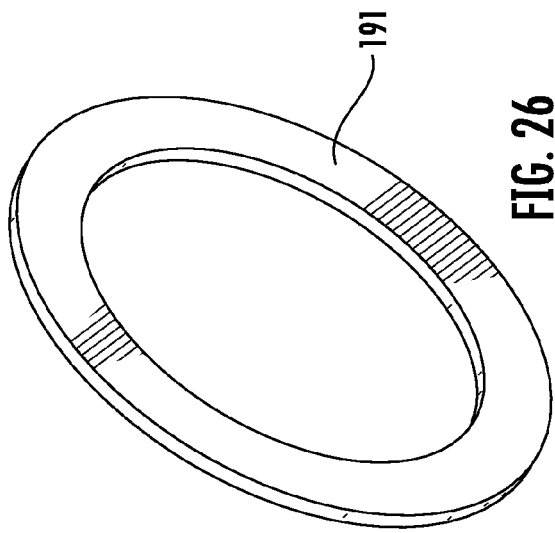
FIG. 26 is a perspective view of a washer of the handle assembly of FIG. 12, shown according to an exemplary embodiment.

Referring to FIGS. 25-26, a washer 191 may be located between the spring 190 and the output shaft 172. The washer 191 may be formed of any suitable, preferably low-friction, material, for example nylon, polyethylene, or polyoxymethylene (e.g., Celcon, Delrin, Hostaform, etc.). The washer 191 facilitates rotation of the output shaft 172 relative to the spring 190, thereby reducing wear and improving user feel.

Figure 27:
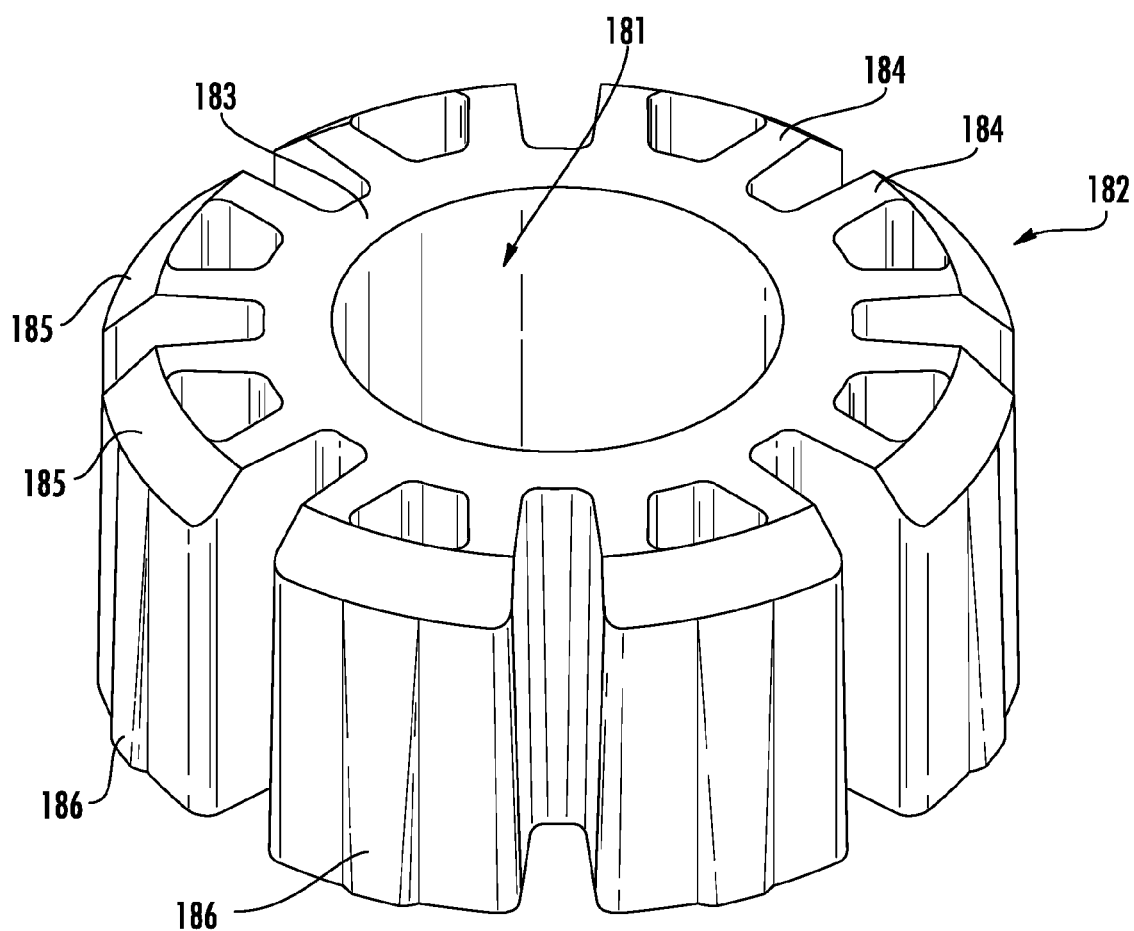
FIG. 27 is a perspective view of a bushing of the handle assembly of FIG. 12, shown according to an exemplary embodiment.
Figure 28:
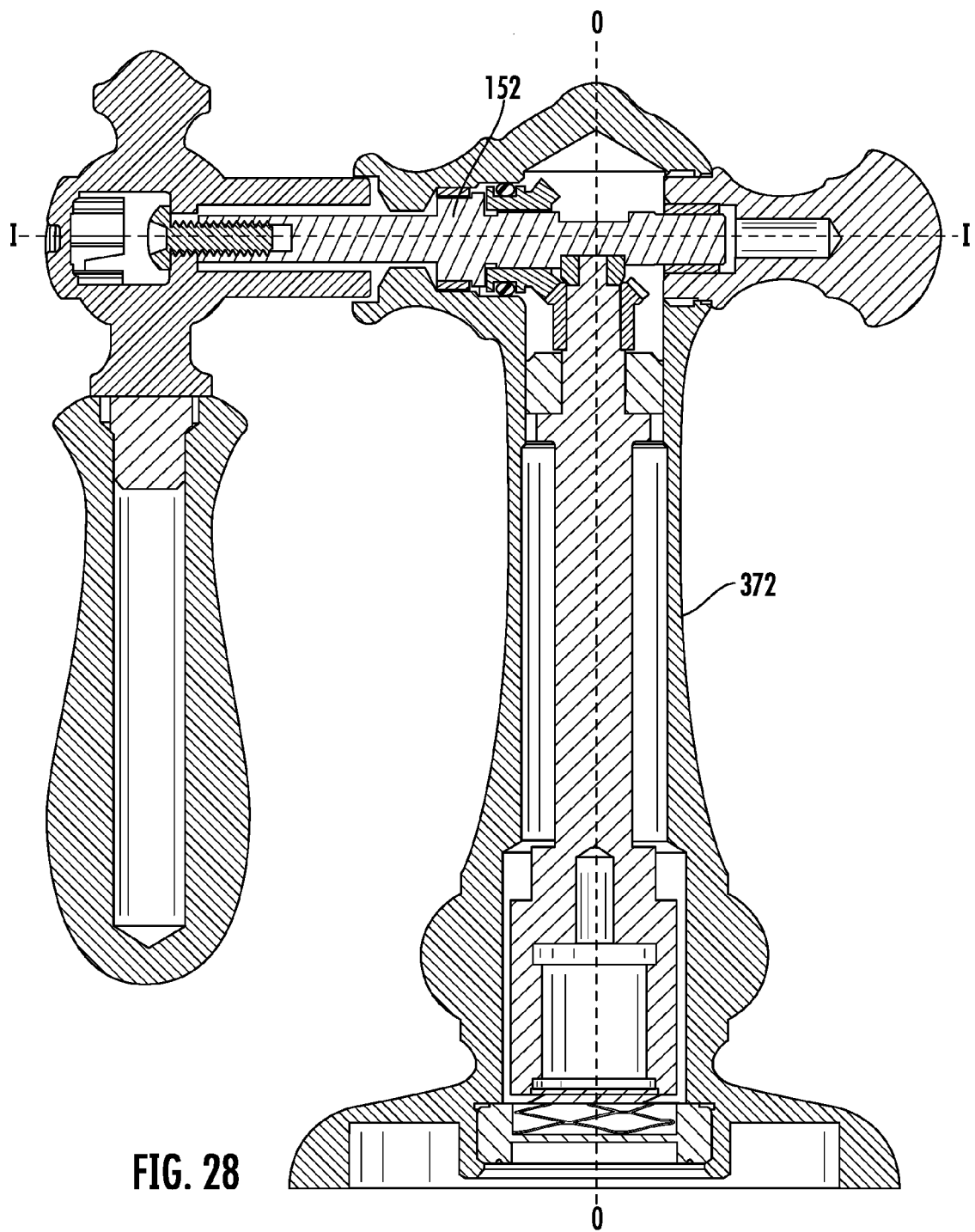
FIG. 28 is a front elevation view of a handle assembly, sectioned through line A-A of FIG. 1, shown according to another exemplary embodiment.
Figure 29:
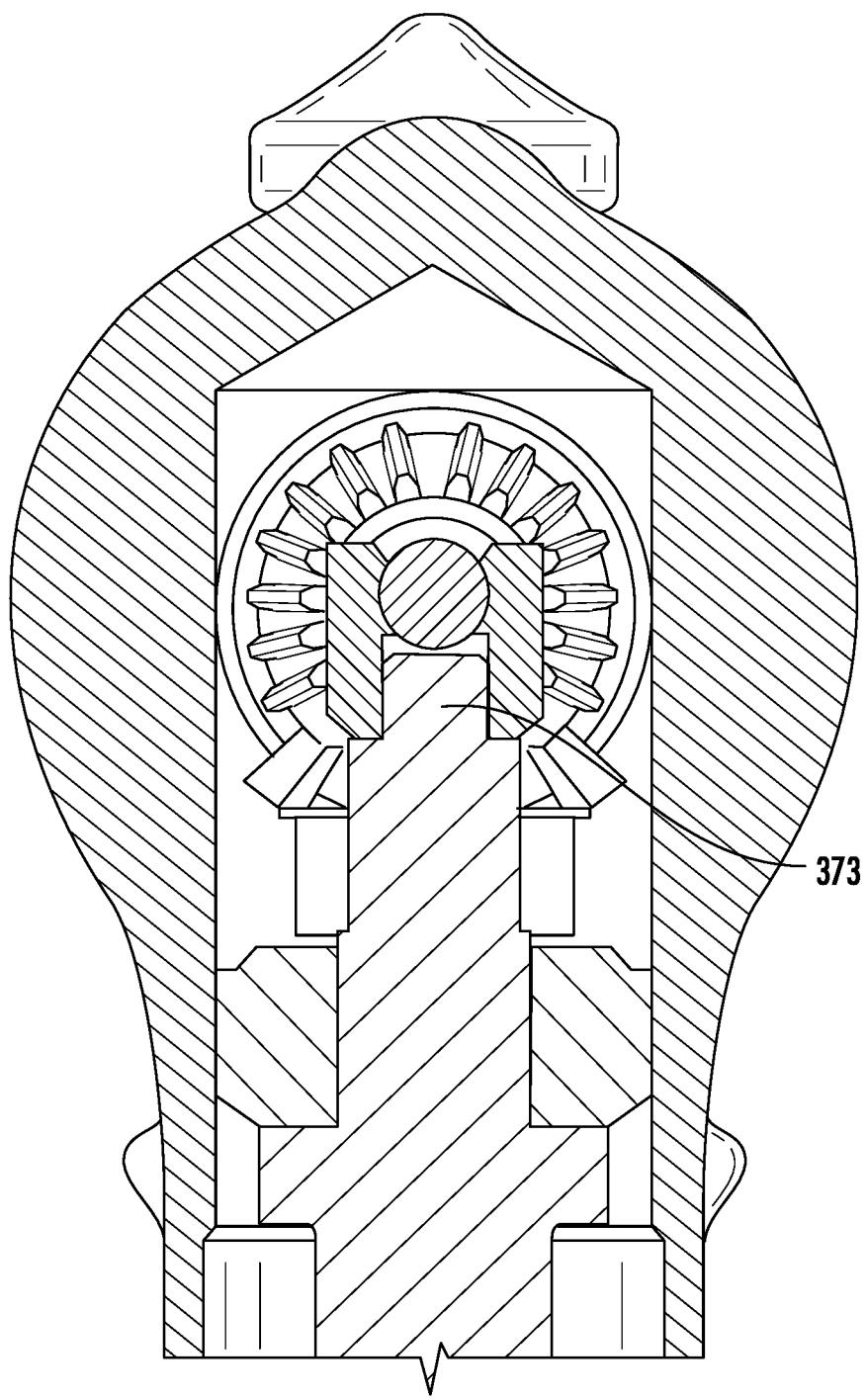
FIG. 29 is a right elevation view of a portion of the handle assembly of FIG. 28, sectioned the output axis O, shown according to an exemplary embodiment.
Figure 30:
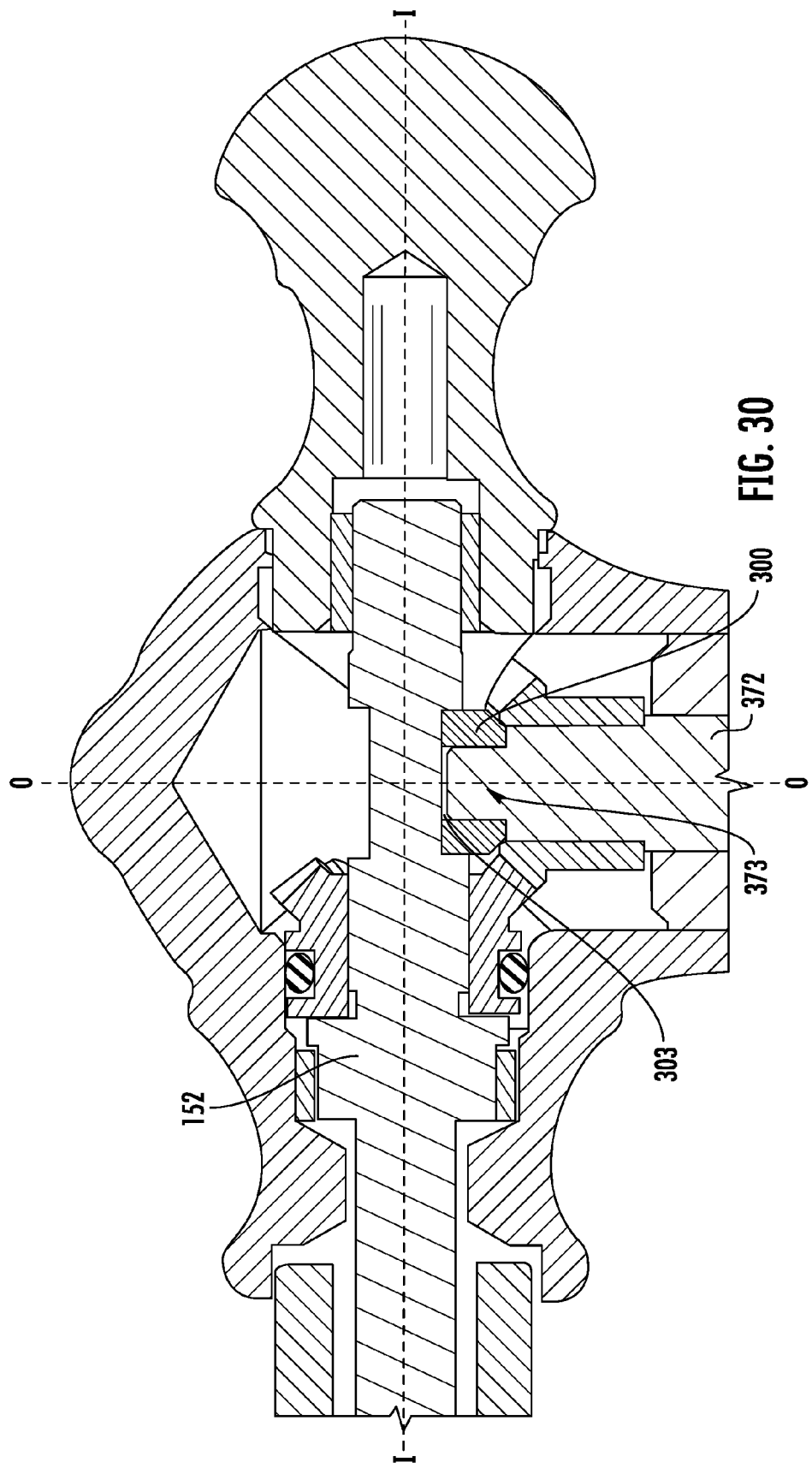
FIG. 30 is a front elevation view of a portion of the handle assembly of FIG. 28, sectioned through line A-A of FIG. 1, shown according to another exemplary embodiment.
Figure 31:
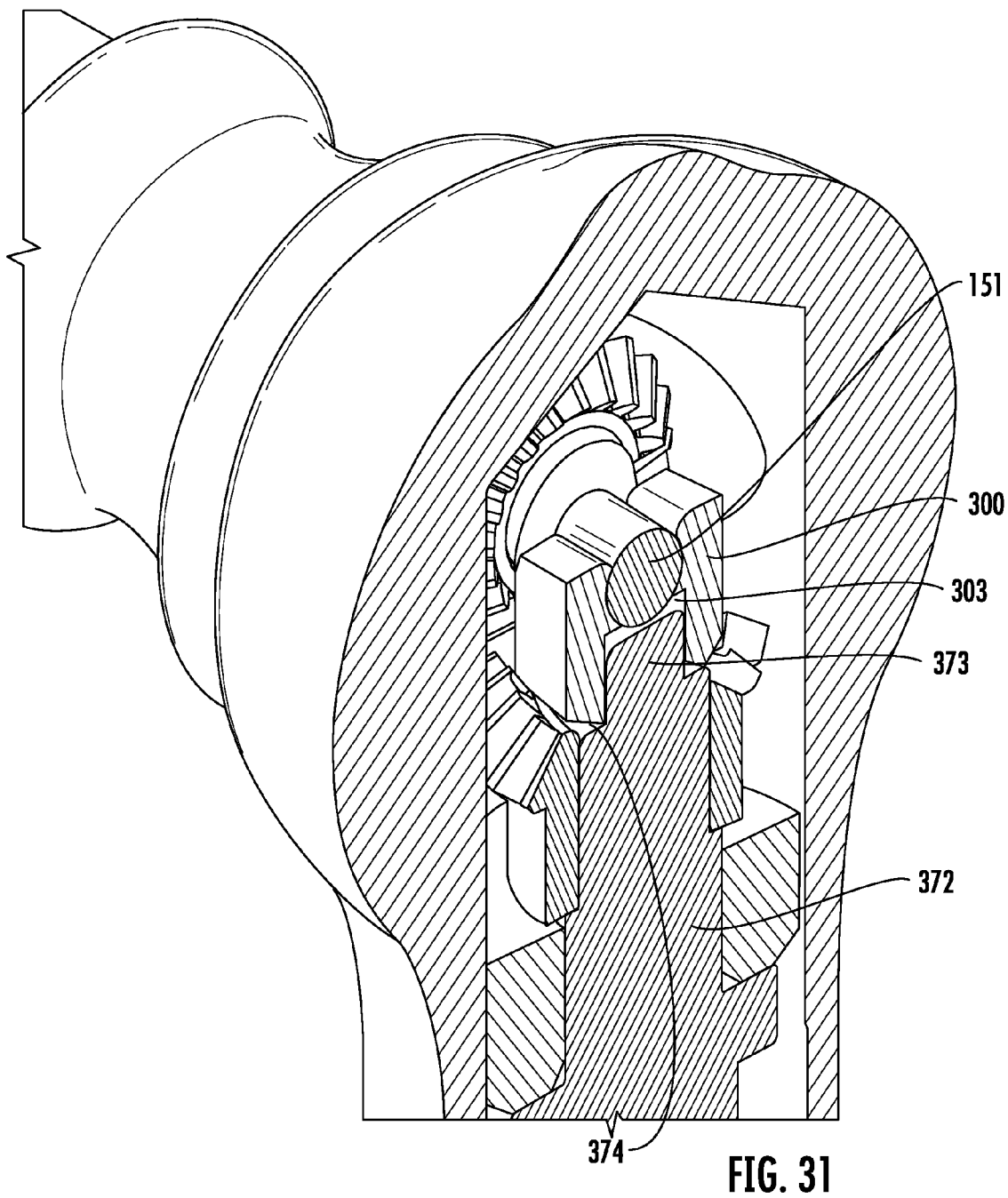
FIG. 31 is a top, front, right perspective view of a portion of the handle assembly of FIG. 28, sectioned through output axis O, shown according to another exemplary embodiment.
Figure 32:
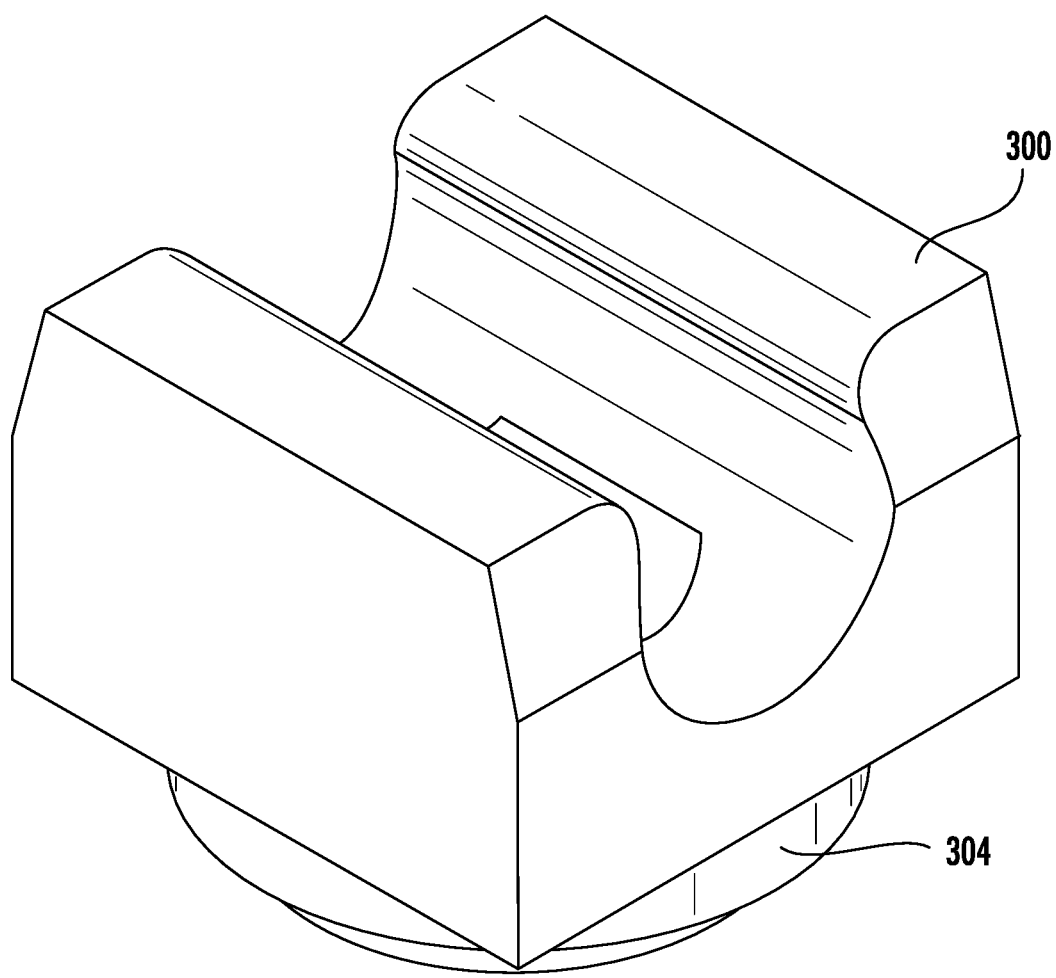
FIG. 32 is a top, front, right perspective view of a saddle, shown according to another exemplary embodiment.
Figure 33:
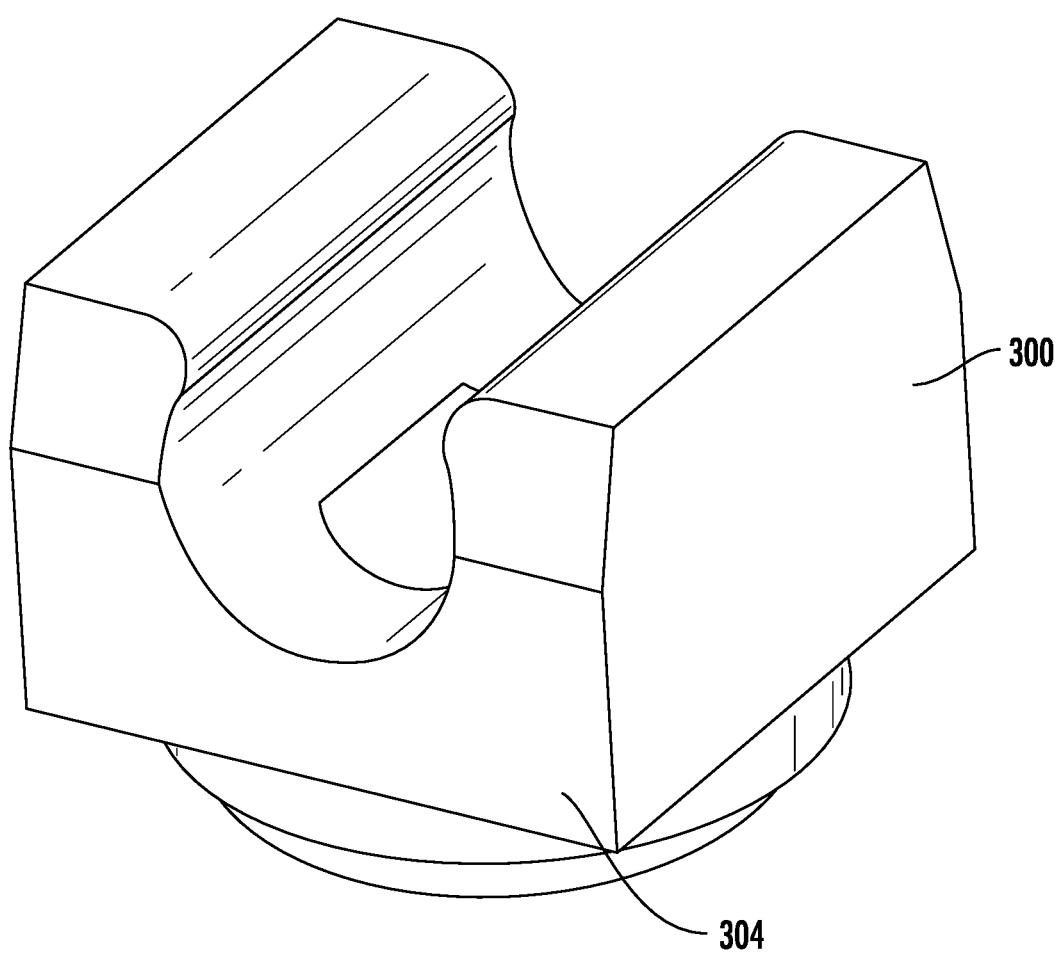
FIG. 33 is a top, front, left perspective view of the saddle of FIG. 32, shown according to an exemplary embodiment.

Referring to FIG. 27, a bushing 182 is shown according to an exemplary embodiment. The bushing 182 is shown to include an inner ring 183 defining an aperture 181 configured to receive the output shaft 172. A plurality of spokes 184 extend radially outward from the inner ring 183. According to the embodiment shown, pairs of spokes 184 are joined by outer members 185. The bushing 182 may be formed of any suitable, preferably low-friction, material, for example nylon, polyethylene, or polyoxymethylene (e.g., Celcon, Delrin, Hostaform, etc.).

The bushing 182 is installed onto the output shaft 172, preferably having a sliding fit to permit rotation with limited wobble, and the output shaft assembly is then installed to the body 122 such that the bushing 182 presses against the body 122. Tapered ribs 186 formed axially along the outer members 185 facilitate engagement between the bushing 182 and the body 122. The bushing 182 may be supported by a flange 180 (shown in FIG. 21).

The spokes 184 and outer members 185 are configured to act like a spring (e.g., to provide radial spring forces), thereby allowing the output shaft 172 to be self-aligning, for example, axially aligned by the post 104 of the saddle 100, the interaction of the output gear 178 and the input gear 158, and/or the valve stem 206 or adapter 208, instead of being aligned relative to the body 122. The self-aligning ability of the bushing 182 reduces rocking of the output shaft 172, may promote concentricity of the output shaft, and promotes engagement of the teeth of input gear 158 and the output gear 178, thereby reducing gear lash (e.g., slop, etc.) which may be dissatisfying to some user.

Further, because the saddle 100 can rotate circumferentially relative to the reduced diameter portion 151, and the bushing 182 provides a spring action, the output shaft 172 may be oriented in a non-vertical position to compensate for misalignment between the valve stem 206 or adapter 208 and the input shaft 152.

It should be noted that in various embodiments, components of the embodiment shown in FIGS. 28-33 may be used with components of the embodiments of FIGS. 1-11 and/or FIGS. 12-27, and components of the embodiment shown in FIGS. 12-27 may be used with components of the embodiments of FIGS. 1-11.

The construction and arrangement of the elements of the handle assembly as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. The elements and assemblies may be constructed from any of a wide variety of materials that provide sufficient strength or durability, in any of a wide variety of colors, textures, and combinations. Additionally, in the subject description, the word "exemplary" is used to mean serving as an example, instance, or illustration. Any embodiment or design described herein as "exemplary" is not necessarily to be construed as preferred or advantageous over other embodiments or designs. Rather, use of the word "exemplary" is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the appended claims.

The order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration, and arrangement of the preferred and other exemplary embodiments without departing from the scope of the appended claims.

What is claimed is:

1. A handle assembly for controlling a flow of water through a valve for a faucet, the handle assembly comprising:
   an output shaft connectable to the valve to control flow of water through the valve upon rotation of the output shaft about a first axis;
   an input shaft rotatable about a second axis that is configured substantially transverse to the first axis, the input shaft connectable to the output shaft to rotate the output shaft upon rotation of the input shaft;
   a handle coupled to the input shaft for rotating the input shaft upon rotation of the handle about the second axis; and
   a saddle interconnecting the input shaft and the output shaft, the saddle comprising:
      a generally "U" shaped or generally "C" shaped body having a channel that supports one of the input shaft and the output shaft; and
      a post extending away from the body for engaging an opening in the other of the input shaft and the output shaft.

2. The handle assembly of claim 1, wherein both the input shaft and the output shaft are rotatable relative to the saddle.

3. The handle assembly of claim 1, wherein the body of the saddle includes a first arm and a second arm that is spaced apart from the first arm with a gap located between the first arm and the second arm defining an open channel disposed between the first and second arms.

4. The handle assembly of claim 3, wherein the body of the saddle is "U" shape, and the saddle comprises a low friction material including at least one of nylon, polyethylene, or polyoxymethylene.

5. The handle assembly of claim 1, wherein the input shaft includes a gear for engaging a gear of the output shaft to rotate the output shaft upon rotation of the input shaft, wherein each gear is one of a spiral bevel gear, a hypoid bevel gear, or a worm gear.

6. The handle assembly of claim 5, further comprising:
   a body assembly including a first bore receiving at least a portion of the input shaft, the body assembly including a second bore receiving at least a portion of the output shaft; and
   a bushing disposed around the portion of the output shaft, wherein the bushing is located between a flange of the output shaft and the saddle, the flange extending radially outward relative to the first axis from a body of the output shaft.

7. The handle assembly of claim 6, wherein the body assembly includes a base for mounting to a surface of one of a deck, a countertop, a sink, and a tub; the second bore extending through the base.

8. The handle assembly of claim 1, wherein the handle is manually rotatable about the second axis by a user of the faucet.

9. A handle assembly for controlling a flow of water through a valve for a faucet, the handle assembly comprising:
   a unitary one-piece body having a first bore and a second bore aligned transverse to and intersecting the first bore;
   an output shaft disposed in the second bore and connectable to the valve to control flow of water through the valve upon rotation of the output shaft;
   an input shaft disposed in the first bore for rotating the output shaft upon rotation thereof;
   a saddle interconnecting the input shaft and the output shaft, the saddle comprising:
      a body supporting one of the input shaft and the output shaft; and
      a post extending away from the body and having a bore that receives the other of the input shaft and the output shaft; and
   a handle supported by the unitary one-piece body and coupled to the input shaft, such that rotation of the handle rotates the input shaft.

10. The handle assembly of claim 9, further comprising a bushing, wherein a hub of the handle engages a portion of the first bore of the unitary one-piece body, the hub is supported by a portion of the unitary one-piece body that defines the portion of the first bore, the bushing is located between the portion of the unitary one-piece body and a flange of the input shaft, and the flange extends radially outward relative to the second axis from a body of the input shaft.

11. The handle assembly of claim 9,
    wherein the body supports the input shaft and
    the bore of the post receives the output shaft, and wherein the output shaft is completely disposed within the first and second bores.

12. The handle assembly of claim 11, further comprising a bushing coupled to the output shaft and positioned to limit travel of the saddle along the output shaft, wherein the body of the saddle includes a channel that receives the input shaft.

13. The handle assembly of claim 9, further comprising:
    a first bushing disposed in the first bore and having an outer surface supported by the unitary one-piece body and an inner surface supporting the input shaft; and
    a second bushing disposed in the second bore and having an outer surface contacting an inner surface of the unitary one-piece body and having an inner surface contacting an outer surface of the output shaft.

14. The handle assembly of claim 13, wherein a first side of the first bushing abuts a flange of the unitary one-piece body, a second, opposite, side of the first bushing abuts a flange of the input shaft, and a side of the second bushing abuts a flange of the output shaft.

15. A handle assembly for controlling a flow of water through a valve for a faucet, the handle assembly comprising:
- a body having a first bore and a second bore aligned transverse to and intersecting the first bore, the body comprising a first material;
- an input shaft disposed in the first bore and rotatable relative to the body;
- a first bearing rotatably supporting the input shaft relative to the body, wherein the first bearing is disposed between a flange of the input shaft and a flange of the body to limit axial movement of the input shaft relative to the body;
- an output shaft disposed in the second bore and rotatable relative to the body upon rotation of the input shaft to control flow of water through the valve operatively coupled to the output shaft;
- a second bearing rotatably supporting the output shaft relative to the body, the second bearing comprising a second material that is different than the first material; and
- a saddle interconnecting the input shaft and the output shaft.

16. The handle assembly of claim 15, further comprising a spring for applying a force on the output shaft to bias the output shaft into engagement with the second bearing, wherein the output shaft includes a flange that limits an axial travel of the output shaft relative to the second bearing.

17. The handle assembly of claim 15, further comprising:
- a handle supported by the body and coupled to a first end of the input shaft, such that rotation of the handle rotates the input shaft, which in-turn rotates the output shaft; and
- an end cap extending from the body at an end of the first bore, the end cap receiving a second end of the input shaft.

18. The handle assembly of claim 17, further comprising a third bearing disposed between the second end of the input shaft and the end cap to rotatably support the input shaft.

19. The handle assembly of claim 18, wherein at least one of the first, second, and third bearings comprises:
- an inner member;
- a plurality of spaced apart and semi-annular outer members; and
- a plurality of spokes extending between the inner member and the outer members.

20. The handle assembly of claim 15, wherein the second bearing is disposed on an end of the output shaft that that is operatively coupled to the input shaft through the saddle, the saddle having a post engaging a bore in the end of the output shaft, the saddle also having a body rotatably supporting the input shaft.

21. The handle assembly of claim 15, wherein the first bearing is disposed completely within the body in the first bore, and wherein the second material is a low friction material including at least one of nylon, polyethylene, or polyoxymethylene.

* * * * *